(12) United States Patent
Sugiura et al.

(10) Patent No.: US 9,784,345 B2
(45) Date of Patent: Oct. 10, 2017

(54) TRANSMISSION DEVICE

(71) Applicant: AISIN AW CO., LTD., Anjo-shi, Aichi-ken (JP)

(72) Inventors: Nobutada Sugiura, Nishio (JP); Takashi Morimoto, Gamagori (JP); Toshihiko Aoki, Anjo (JP); Hiroshi Kato, Kariya (JP); Satoru Kasuya, Nishio (JP); Masahiro Otake, Nishio (JP); Masanori Murakami, Iwakura (JP); Takuya Nakajima, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/908,806

(22) PCT Filed: Sep. 5, 2014

(86) PCT No.: PCT/JP2014/073519
§ 371 (c)(1),
(2) Date: Jan. 29, 2016

(87) PCT Pub. No.: WO2015/034057
PCT Pub. Date: Mar. 12, 2015

(65) Prior Publication Data
US 2016/0160964 A1    Jun. 9, 2016

(30) Foreign Application Priority Data

Sep. 9, 2013  (JP) ................. 2013-186310
Nov. 29, 2013 (JP) ................. 2013-248653

(51) Int. Cl.
*F16H 3/62* (2006.01)
*F16H 3/66* (2006.01)
(Continued)

(52) U.S. Cl.
CPC ......... *F16H 3/663* (2013.01); *F16D 25/0638* (2013.01); *F16H 3/66* (2013.01);
(Continued)

(58) Field of Classification Search
None
See application file for complete search history.

(56) References Cited

U.S. PATENT DOCUMENTS 6,120,410 A    9/2000    Taniguchi et al.
6,428,444 B1   8/2002    Tabata
(Continued)

FOREIGN PATENT DOCUMENTS

JP    2000-120813 A    4/2000
JP    2000-220705 A    8/2000
(Continued)

OTHER PUBLICATIONS

Mar. 3, 2015 Search Report issued in International Patent Application No. PCT/JP2014/081039.
(Continued)

*Primary Examiner* — Dirk Wright
(74) *Attorney, Agent, or Firm* — Oliff PLC

(57) ABSTRACT

A transmission device, wherein the compound planetary gear mechanism increases the speed of the power transmitted to the input element and transmits the resultant power to the first and the second output elements when the fixable element is non-rotatably held stationary by the first brake; and the first and the second clutches are disposed on a side closer in the axial direction to the compound planetary gear mechanism than the first and the second planetary gear mechanisms.

20 Claims, 12 Drawing Sheets

(51) Int. Cl.
  *F16D 25/0638* (2006.01)
  *F16H 37/08* (2006.01)
  *F16H 61/02* (2006.01)
  *F16D 25/10* (2006.01)
  *F16H 61/00* (2006.01)

(52) U.S. Cl.
  CPC ......... *F16H 3/666* (2013.01); *F16H 37/0813* (2013.01); *F16H 61/0265* (2013.01); *F16D 25/10* (2013.01); *F16H 2061/0046* (2013.01); *F16H 2200/0069* (2013.01); *F16H 2200/2012* (2013.01); *F16H 2200/2023* (2013.01); *F16H 2200/2046* (2013.01)

(56) References Cited

U.S. PATENT DOCUMENTS

| | | | |
|---|---|---|---|
| 8,096,915 | B2 | 1/2012 | Wittkopp et al. |
| 8,197,375 | B1 | 6/2012 | Hart et al. |
| 8,202,190 | B2 * | 6/2012 | Phillips ............... F16H 3/66 475/275 |
| 8,425,370 | B2 | 4/2013 | Leesch et al. |
| 2006/0122025 | A1 | 6/2006 | Hayabuchi et al. |
| 2009/0011893 | A1 | 1/2009 | Kato et al. |
| 2009/0054196 | A1 | 2/2009 | Phillips et al. |
| 2010/0210397 | A1 | 8/2010 | Wittkopp et al. |
| 2010/0216591 | A1 | 8/2010 | Wittkopp et al. |
| 2010/0331136 | A1 | 12/2010 | Jang et al. |
| 2011/0251014 | A1 | 10/2011 | Leesch et al. |
| 2012/0088625 | A1 | 4/2012 | Phillips et al. |
| 2012/0178581 | A1 | 7/2012 | Wittkopp et al. |
| 2013/0029799 | A1 | 1/2013 | Park et al. |
| 2013/0053207 | A1 | 2/2013 | Wilton et al. |
| 2015/0267787 | A1 | 9/2015 | Hart |
| 2016/0138683 | A1 | 5/2016 | Kato et al. |
| 2016/0265629 | A1 | 9/2016 | Nakajima et al. |
| 2016/0265630 | A1 | 9/2016 | Iwase et al. |
| 2016/0273621 | A1 | 9/2016 | Jinnai et al. |
| 2016/0298735 | A1 | 10/2016 | Maeda et al. |

FOREIGN PATENT DOCUMENTS

| | | |
|---|---|---|
| JP | 2001-071792 A | 3/2001 |
| JP | 2004-353713 A | 12/2004 |
| JP | 2012-507667 A | 3/2012 |
| WO | 2015/029481 A1 | 3/2015 |

OTHER PUBLICATIONS

Oct. 31, 2016 European Search Report issued in European Patent Application No. 14865674.7.
Jan. 12, 2017 Office Action issued in U.S. Appl. No. 15/030,309.
Belz, Thomas. "Varianten von Mehrgang-Planetengetrieben". pp. 1-19, 2016.
Feb. 22, 2017 Supplementary European Search Report issued in European Patent Application No. 14842944.2.
U.S. Appl. No. 15/030,309, filed Apr. 18, 2016 in the name of Kato et al.
Dec. 2, 2014 International Search Report issued in International Patent Application No. PCT/JP2014/073519.

* cited by examiner

FIG. 4

|  | C1 | C2 | C3 | C4 | B1 | B2 | GEAR RATIO | STEP RATIO |
|---|---|---|---|---|---|---|---|---|
| 1st | - | - | O | O | O | - | 5.091 | 1.581 |
| 2nd | - | - | - | O | O | O | 3.219 | 1.378 |
| 3rd | - | - | O | - | O | O | 2.337 | 1.239 |
| 4th | O | - | - | - | O | O | 1.886 | 1.271 |
| 5th | O | - | O | - | - | O | 1.484 | 1.245 |
| 6th | O | - | - | O | - | O | 1.192 | 1.192 |
| 7th | O | O | - | O | - | - | 1.000 | 1.273 |
| 8th | O | O | - | - | - | O | 0.785 | 1.242 |
| 9th | - | O | - | O | - | O | 0.632 | 1.074 |
| 10th | - | O | O | - | - | O | 0.589 | |
| REV. | - | O | O | - | O | - | -4.954 | 0.973 |
| ※ "O": ENGAGED, "-": DISENGAGED | | | | | | | SPREAD | 8.648 |

TRANSMISSION DEVICE

BACKGROUND

The present disclosure relates to a transmission device that changes a speed of power transmitted from a motor of a vehicle to an input shaft and transmits the resultant power to an output shaft.

Conventionally, a transmission device that includes two single-pinion type planetary gears, what is called a Simpson compound planetary gear mechanism, four clutches, and two brakes are known as a transmission device of such a type. (see U.S. Pat. No. 8,202,190, for example). The compound planetary gear mechanism included in such a transmission device includes an input element connected to an input shaft, a fixable element selectively non-rotatably held stationary by a brake, and first and second output elements. The first output element is selectively connected to another rotational element by a first clutch, and the second output element is selectively connected to yet another rotational element by a second clutch.

SUMMARY

The compound planetary gear mechanism included in the conventional transmission device described above transmits power transmitted to the input element to the first and the second output members at an increased speed when the fixable element is non-rotatably held stationary by the brake. As a result, in the transmission device described above, the maximum rotational speeds of components, such as clutch hubs and clutch drums, of the first clutch corresponding to the first output element and the second clutch corresponding to the second output element become high, so that the components are subjected to high centrifugal forces unless some measures are taken. Trying to secure strength of the components subjected to such high centrifugal forces causes increases in size and cost of the components, and consequently, of the transmission device.

Thus, an exemplary aspect of the present disclosure reduces the increases in size and cost of a transmission device including clutches having components that rotate at high speeds.

A transmission device according to an exemplary aspect of the present disclosure changes a speed of power transmitted from a motor to an input shaft, and transmits the resultant power to an output shaft the transmission device including: a compound planetary gear mechanism including an input element, a fixable element, a first output element, and a second output element; a first planetary gear and a second planetary gear disposed coaxially and side by side in the axial direction with the compound planetary gear mechanism, and each including a plurality of rotational elements; a first brake that connects and non-rotatably holds the fixable element of the compound planetary gear mechanism stationary to a case and releases the fixable element such that the fixable element is rotatable; a first clutch that connects the first output element to at least one of the rotational elements of the first and the second planetary gears and releases the connection therebetween; and a second clutch that connects the second output element to at least one of the rotational elements of the first and the second planetary gears and releases the connection therebetween wherein the compound planetary gear mechanism increases the speed of the power transmitted to the input element and transmits the resultant power to the first and the second output elements when the fixable element is non-rotatably held stationary by the first brake; and the first and the second clutches are disposed on a side closer in the axial direction to the compound planetary gear mechanism than the first and the second planetary gear mechanisms.

This transmission device changes the speed of the power transmitted from the motor to the input shaft and transmits the resultant power to the output shaft. The transmission device includes the compound planetary gear mechanism. The compound planetary gear mechanism increases the speed of the power transmitted to the input element and transmits the resultant power to the first and the second output elements when the fixable element is non-rotatably held stationary by the brake. In this transmission device, the first clutch that selectively connects the first output element of the compound planetary gear mechanism to at least one of the rotational elements of the first and the second planetary gears and the second clutch that connects the second output element to at least one of the rotational elements of the first and the second planetary gears are disposed on the side closer in the axial direction to the compound planetary gear mechanism than the first and the second planetary gear mechanisms. This structure can keep the axial lengths of components (such as a clutch hub and a clutch drum) of the first clutch connected to the first output element of the compound planetary gear mechanism and components of the second clutch connected to the second output element of the compound planetary gear mechanism from increasing, and can reduce the rotational inertia of these components and deformation of the components due to centrifugal forces. As a result, increases in sizes and costs of the first and the second clutches associated with securing of sufficient strength can be suppressed, thereby suppressing increase in size and cost of the transmission device. Note that the element on the other side of the connection with the first output element may be the same as or different from the element on the other side of the connection with the second output element.

The second planetary gear may be disposed on a side closer to the compound planetary gear mechanism than the first planetary gear. The first clutch may connect the first output element to any one of the rotational elements of the second planetary gear and release the connection therebetween. The second clutch may connect the second output element to any one of the rotational elements of the second planetary gear and release the connection therebetween. The first and the second clutches may be arranged on a side closer to the compound planetary gear mechanism than the second planetary gear. This structure eliminates the need for structuring the components of the first and the second clutches connected to the first and the second output elements of the compound planetary gear mechanism so as to wrap around the first planetary gear. As a result, the components of the first and the second clutches connected to the first and the second output elements rotating faster than the input element can be reduced in diameter, so that the rotational inertia of the components can be reduced to easily secure the strength and improve the shift performance of the transmission device.

Moreover, the second clutch may connect the second output element to the rotational element of the second planetary gear connected to the first output element by the first clutch.

The transmission device may further include a third clutch that connects the first output element of the compound planetary gear mechanism and a rotational element of the second planetary gear other than the rotational element thereof that is connected to the first output element by the first clutch and connected to the second output element by the second clutch and releases the connection therebetween, and the third clutch may be disposed on a side closer to the compound planetary gear mechanism than the second planetary gear.

Moreover, the case may be provided with a center wall located between the compound planetary gear mechanism and the first and the second planetary gears; the third clutch may include a hydraulic servo including at least a friction engagement plate and a piston that presses the friction engagement plate; and hydraulic oil may be supplied from a hydraulic oil supply passage formed in the center wall to the hydraulic servo of the third clutch without passing through the input shaft. This structure can suppress increase in the number of in-shaft oil-passages to be formed in the input shaft, thereby reducing the diameters of the input shaft and members disposed around the input shaft so as to favorably keep the overall size of the device from increasing.

The transmission device may further include a second brake that includes at least a friction engagement plate and a piston pressing the friction engagement plate and connects and non-rotatably holds the rotational element of the second planetary gear connected to the first output element by the third clutch stationary to the case; the case may be provided with a center wall located between the compound planetary gear mechanism and the first and the second planetary gears; and an engagement oil chamber of the second brake may be defined between the piston of the second brake and the center wall.

Moreover, the first and the second clutches each may include a hydraulic servo that includes at least a friction engagement plate and a piston pressing the friction engagement plate and is disposed on the input shaft, and hydraulic oil may be supplied from a hydraulic oil supply passage formed in the case to the hydraulic servo of each of the first and the second clutches through an in-shaft oil-passage formed in the input shaft. Disposing the hydraulic servo of each of the first and the second clutches in this way can keep the outside diameter of the hydraulic servo from increasing, and can reduce the rotational inertia of the components of the first and the second clutches.

The transmission device may further include a fourth clutch that connects any one of the rotational elements of the first planetary gear to the output shaft and releases the connection therebetween, and the second planetary gear may include a rotational element always connected to the output shaft and a rotational element always connected to a rotational element of the first planetary gear other than the rotational element thereof connected to the output shaft by the fourth clutch.

Moreover, the fourth clutch may include at least a friction engagement plate and a piston that presses the friction engagement plate, and an engagement oil chamber of the fourth clutch may be defined between the piston of the fourth clutch and the output shaft and may be supplied with hydraulic oil through an in-shaft oil-passage formed in the output shaft.

The compound planetary gear mechanism may include third and fourth planetary gears each including three rotational elements and may be structured by always connecting each of any two of the rotational elements of the third planetary gear to corresponding one of any two of the rotational elements of the fourth planetary gear.

Moreover, the first planetary gear may include a first rotational element, a second rotational element, and a third rotational element that are sequentially arranged side by side at intervals corresponding to a gear ratio in a velocity diagram; the second planetary gear may include a fourth rotational element, a fifth rotational element, and a sixth rotational element that are sequentially arranged side by side at intervals corresponding to a gear ratio in a velocity diagram; the first rotational element of the first planetary gear may be always connected to the fourth rotational element of the second planetary gear; the second rotational element of the first planetary gear and the input element of the compound planetary gear mechanism may be always connected to the input shaft; the fifth rotational element of the second planetary gear may be always connected to the output shaft; the first clutch may connect the first rotational element of the first planetary gear and the fourth rotational element of the second planetary gear always connected to each other to the first output element of the compound planetary gear mechanism and release the connection therebetween; the second clutch may connect the first rotational element of the first planetary gear and the fourth rotational element of the second planetary gear always connected to each other to the second output element of the compound planetary gear mechanism and release the connection therebetween; and the transmission device may further include a third clutch that connects the sixth rotational element of the second planetary gear to the first output element of the compound planetary gear mechanism and releases the connection therebetween, a fourth clutch that connects the output shaft and the fifth rotational element of the second planetary gear always connected to each other to the third rotational element of the first planetary gear and releases the connection therebetween, and a second brake that non-rotatably holds the sixth rotational element of the second planetary gear stationary and releases the sixth rotational element such that the sixth rotational element is rotatable.

This transmission device includes the first and the second planetary gears, the compound planetary gear mechanism, the first, the second, the third, and the fourth clutches, and the first and the second brakes. With this structure, the transmission device can provide first to tenth forward speeds and a reverse speed by engaging and disengaging the first to the fourth clutches and the first and the second brakes. As a result, this transmission device can improve the fuel economy of a vehicle particularly at high speeds and the acceleration performance at each of the shift speeds by employing a larger spread (gear ratio range=gear ratio of the lowest shift speed/gear ratio of the highest shift speed), and can also improve the shift feel by employing an appropriate value of each step ratio (gear ratio of a certain shift speed/gear ratio of a shift speed higher by one step) (by keeping the step ratio from increasing). Thus, the transmission device can favorably improve both the fuel economy and the drivability of the vehicle.

In this transmission device, the second rotational element of the first planetary gear is always connected to the input shaft in the same way as the input element of the compound planetary gear mechanism, and the third rotational element of the first planetary gear is selectively connected to the output member (and the fifth rotational element of the second planetary gear) by the fourth clutch. This feature can reduce the torque distributed to the fourth clutch compared with that of a clutch that selectively connects the second rotational element to the input shaft, for example, in a transmission device in which the third rotational element of the first planetary gear is always connected to the output member together with the fifth rotational element of the second planetary gear, and the second rotational element of the first planetary gear is selectively connected to the input shaft. As a result, the fourth clutch in this transmission device can be reduced in size in at least one of the axial direction and the radial direction. Thus, the transmission device can improve both the transmission efficiency of power and the drivability, and the overall size of the device can be kept from increasing.

In this transmission device, the first to the tenth forward speeds and the reverse speed are established by engaging any three of the six engagement elements, that is, the first to the fourth clutches and the first and the second brakes, and disengaging the remaining three engagement elements. This feature can reduce the number of engagement elements that are disengaged as each of the shift speeds is established, compared with that of, for example, a transmission device that establishes a plurality of shift speeds by engaging two of the six engagement elements and disengaging the remaining four engagement elements. As a result, the transmission efficiency of power in the transmission device can be further improved by reducing dragging losses in the engagement elements that are disengaged as each of the shift speeds is established.

Specifically, the first forward speed is established by engaging the first clutch, the second clutch, and the second brake; the second forward speed is established by engaging the first clutch, the first brake, and the second brake; the third forward speed is established by engaging the second clutch, the first brake, and the second brake; the fourth forward speed is established by engaging the fourth clutch, the first brake, and the second brake; the fifth forward speed is established by engaging the second clutch, the fourth clutch, and the first brake; the sixth forward speed is established by engaging the first clutch, the fourth clutch, and the first brake; the seventh forward speed is established by engaging the first clutch, the third clutch, and the fourth clutch; the eighth forward speed is established by engaging the third clutch, the fourth clutch, and the first brake; the ninth forward speed is established by engaging the first clutch, the third clutch, and the first brake; the tenth forward speed is established by engaging the second clutch, the third clutch, and the first brake; and the reverse speed is established by engaging the second clutch, the third clutch, and the second brake.

The compound planetary gear mechanism may include a single-pinion type third planetary gear including a third sun gear, and a third ring gear, a third carrier that rotatably and revolvably holds a plurality of third pinion gears each meshing with the third sun gear and the third ring gear, and may also include a single-pinion type fourth planetary gear including a fourth sun gear, a fourth ring gear, and a fourth carrier that rotatably and revolvably holds a plurality of fourth pinion gears each meshing with the fourth sun gear and the fourth ring gear. The fixable element may be the third sun gear and the fourth sun gear always connected to each other. The input element may be the third carrier. The first output element may be the third ring gear and the fourth carrier always connected to each other. The second output element may be the fourth ring gear.

Moreover, the compound planetary gear mechanism may include a single-pinion type third planetary gear including a third sun gear, a third ring gear, and a third carrier that rotatably and revolvably holds a plurality of third pinion gears each meshing with the third sun gear and the third ring gear, and may also include a single-pinion type fourth planetary gear including a fourth sun gear, a fourth ring gear, and a fourth carrier that rotatably and revolvably holds a plurality of fourth pinion gears each meshing with the fourth sun gear and the fourth ring gear. The fixable element may be the fourth sun gear. The input element may be the third ring gear and the fourth carrier always connected to each other. The first output element may be the third carrier and the fourth ring gear always connected to each other. The second output element may be the third sun gear.

The compound planetary gear mechanism may be a Ravigneaux type planetary gear including a third sun gear, a fourth sun gear, a third pinion gear meshing with the third sun gear, a fourth pinion gear meshing with the fourth sun gear and also meshing with the third pinion gear, a third carrier rotatably and revolvably holding the third and the fourth pinion gears, and a third ring gear meshing with the fourth pinion gear. The fixable element may be the fourth sun gear. The input element may be the third carrier. The first output element may be the third ring gear. The second output element may be the third sun gear.

Moreover, the output shaft may be connected to rear wheels of the vehicle via a differential gear.

BRIEF DESCRIPTION OF THE DRAWINGS

FIG. 4 is an operation table showing relations of respective shift speeds with operating states of clutches and brakes in the transmission device according to the present disclosure.

DETAILED DESCRIPTION OF EMBODIMENTS

The following will describe modes for carrying out the present disclosure with reference to the drawings.

Figure 1:
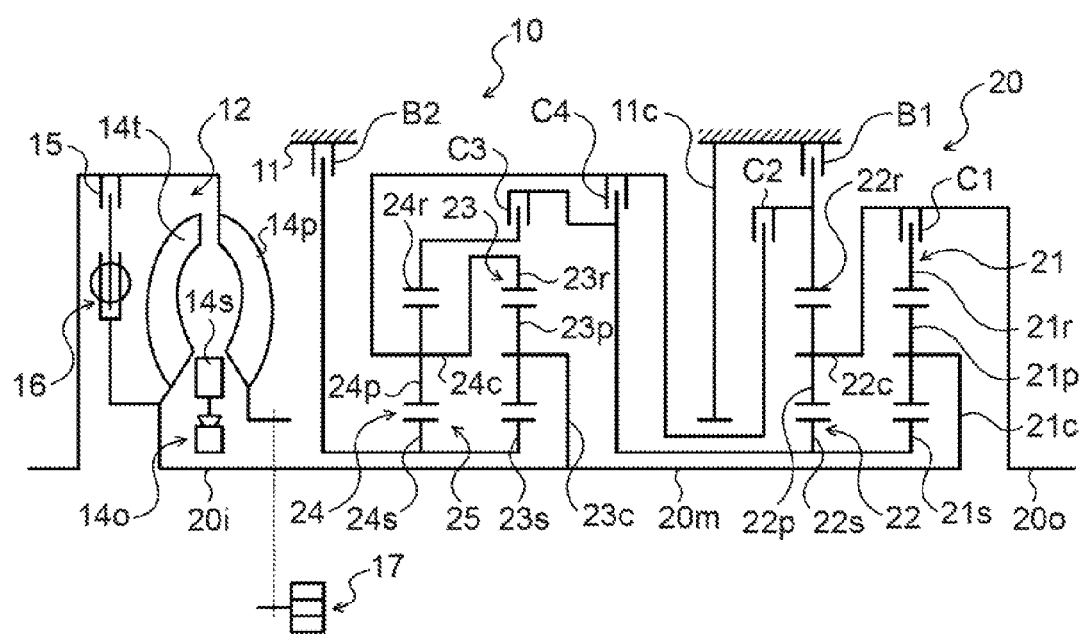
FIG. 1 is a schematic structure diagram of a power transmission device including a transmission device according to the present disclosure.
Figure 2:
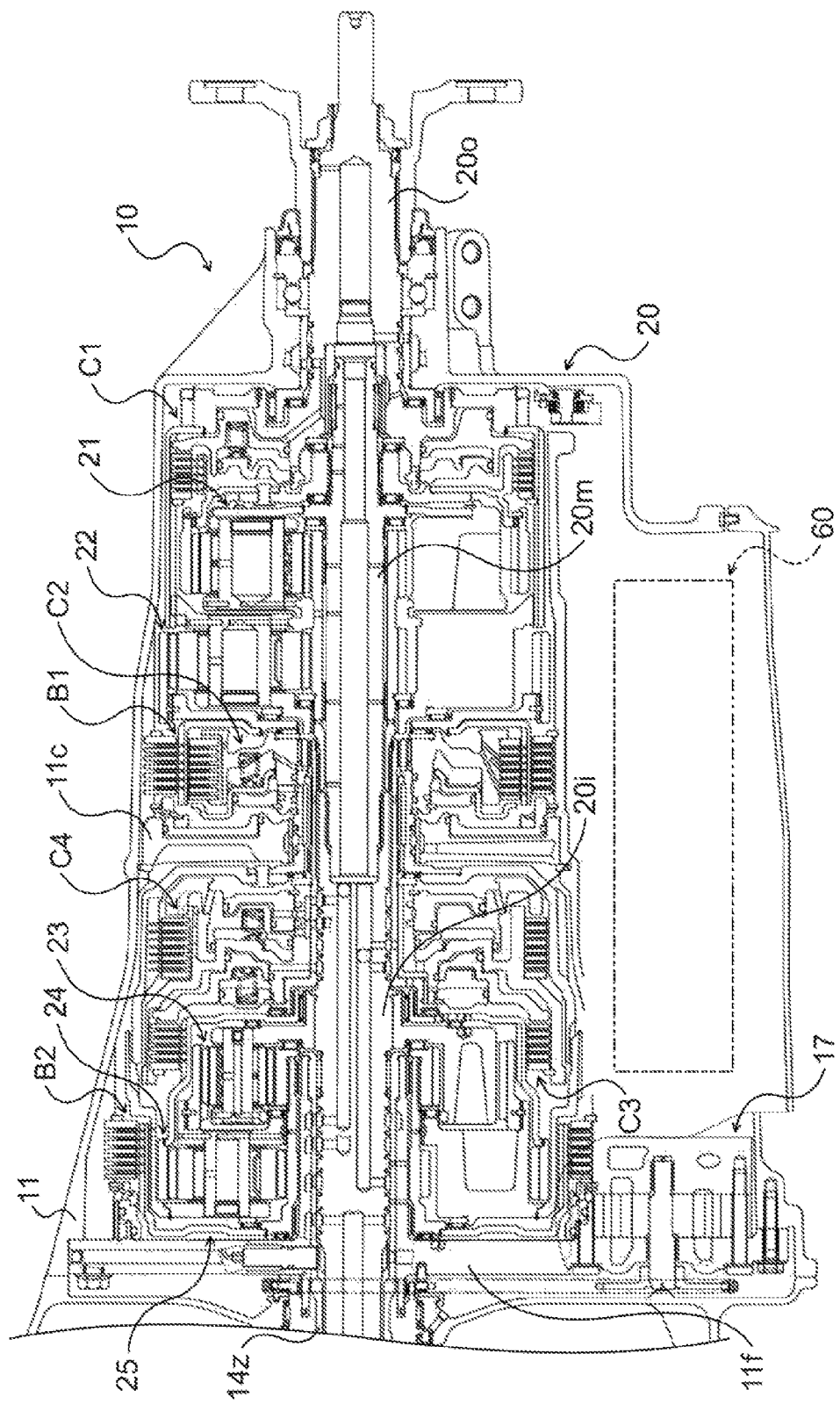
FIG. 2 is a sectional view showing the power transmission device of FIG. 1.

FIG. 1 is a schematic structure diagram of a power transmission device 10 including an automatic transmission 20 serving as a transmission device according to an embodiment of the present disclosure. FIG. 2 is a sectional view showing the power transmission device 10. The power transmission device 10 shown in FIGS. 1 and 2 is connected to a crankshaft of an engine (internal combustion engine) and/or a rotor of an electric motor (not shown) serving as a driving source longitudinally mounted on the front of a rear-wheel-drive vehicle, and can transmit power (torque) from the engine or the like to left and right rear wheels (driving wheels) (not shown). As shown in FIG. 1, the power transmission device 10 includes, for example, a transmission case (stationary member) 11, a starting device (fluid transmission apparatus) 12, and an oil pump 17, in addition to the automatic transmission 20.

The starting device 12 includes a torque converter that includes, for example, a pump impeller 14p on the input side connected to the driving source described above, a turbine runner 14t on the output side connected to an input shaft (input member) 20i of the automatic transmission 20, a stator 14s that is disposed inside the pump impeller 14p and the turbine runner 14t and regulates the flow of hydraulic oil from the turbine runner 14t to the pump impeller 14p, and a one-way clutch 140 that is supported by a stator shaft 14z (see FIG. 2) and restricts the direction of rotation of the stator 14s to one direction. Moreover, the starting device 12 includes a lock-up clutch 15 for connecting and disconnecting a front cover connected to the engine crankshaft or the like to and from the input shaft 20i of the automatic transmission 20 and a damper mechanism 16 for attenuating vibration between the front cover and the input shaft 20i of the automatic transmission 20. Note that the starting device 12 may include a fluid coupling that does not include the stator 14s.

The oil pump 17 is structured as a gear pump that includes, for example, a pump assembly including a pump body and a pump cover, an external gear (inner rotor) connected to the pump impeller 14p of the starting device 12 via a chain or a gear train, and an internal gear (outer rotor) meshing with the external gear. The oil pump 17 is driven by the power from the engine or the like to suction the hydraulic oil (ATF) reserved in an oil pan (not shown) and feed the hydraulic oil with pressure to a hydraulic pressure control device 60 (see FIG. 2).

The automatic transmission 20 is structured as a ten-speed transmission, and, as shown in FIGS. 1 and 2, includes, in addition to the input shaft 20i, an output shaft (output member) 20o connected to the left and right wheels via a differential gear and drive shafts (not shown), single-pinion type first and second planetary gears 21 and 22 provided side by side in the axial direction of the automatic transmission 20 (the input shaft 20i and the output shaft 20o), and a Simpson compound planetary gear train (compound planetary gear mechanism) 25 including single-pinion type third and fourth planetary gears 23 and 24. Moreover, the automatic transmission 20 includes the following clutches and brakes for changing a power transmission path from the input shaft 20i to the output shaft 20o: a clutch C1 (fourth clutch), a clutch C2 (third clutch), a clutch C3 (second clutch), a clutch C4 (first clutch), a brake B1 (second brake), and a brake B2 (first brake).

In the present embodiment, the first and the second planetary gears 21 and 22 and the compound planetary gear train 25 are provided in the transmission case 11 so as to be arranged side by side from the starting device 12 side, that is, from the engine side (left side in FIGS. 1 and 2) in the order of the compound planetary gear train 25, the second planetary gear 22, and the first planetary gear 21, that is, in the order of the fourth planetary gear 24, the third planetary gear 23, the second planetary gear 22, and the first planetary gear 21. With this arrangement, the compound planetary gear train 25 (fourth planetary gear 24) is disposed on the front side of the vehicle so as to be close to the engine (not shown), the first planetary gear 21 is disposed on the rear side of the vehicle so as to be close to the output shaft 20o, and the second planetary gear 22 is disposed between the compound planetary gear train 25 (third planetary gear 23) and the first planetary gear 21.

The first planetary gear 21 includes a first sun gear 21s that is an external gear, a first ring gear 21r that is an internal gear disposed concentrically with the first sun gear 21s, a plurality of first pinion gears 21p each meshing with the first sun gear 21s and the first ring gear 21r, and a first carrier 21c for rotatably and revolvably holding the first pinion gears 21p. In the present embodiment, a gear ratio $\lambda 1$ (the number of teeth of the first sun gear 21s/the number of teeth of the first ring gear 21r) of the first planetary gear 21 is set so that, for example, $\lambda 1 = 0.277$.

As shown in FIG. 1, the first carrier 21c of the first planetary gear 21 is always connected (fixed) to an intermediate shaft 20m of the automatic transmission 20 connected to the input shaft 20i. As a result, the power from the engine or the like is always transmitted to the first carrier 21c via the input shaft 20i and the intermediate shaft 20m while the power is transmitted from the engine and/or the like to the input shaft 20i. Thus, the first carrier 21c functions as an input element of the first planetary gear 21 (first input element of the automatic transmission 20) while the clutch C1 (fourth clutch) is engaged. The first ring gear 21r of the first planetary gear 21 functions as an output element of the first planetary gear 21 (first output element of the automatic transmission 20). Note that the first carrier 21c idly rotates while the clutch C1 (fourth clutch) is disengaged.

The second planetary gear 22 includes a second sun gear 22s that is an external gear, a second ring gear 22r that is an internal gear disposed concentrically with the second sun gear 22s, a plurality of second pinion gears 22p each meshing with the second sun gear 22s and the second ring gear 22r, and a second carrier 22c for rotatably and revolvably holding the second pinion gears 22p. In the present embodiment, a gear ratio $\lambda 2$ (the number of teeth of the second sun gear 22s/the number of teeth of the second ring gear 22r) of the second planetary gear 22 is set so that, for example, $\lambda 2 = 0.244$.

As shown in FIG. 1, the second sun gear 22s of the second planetary gear 22 is integrally connected (always connected) to the first sun gear 21s of the first planetary gear 21, and rotates or stops always together (and concentrically) with the first sun gear 21s. The first sun gear 21s and the second sun gear 22s may, however, be structured as separate bodies and always connected to each other via a connecting member (first connecting member) (not shown). The second carrier 22c of the second planetary gear 22 is always connected to the output shaft 20o, and rotates or stops always together (and concentrically) with the output shaft 20o. As a result, the second carrier 22c functions as an output element of the second planetary gear 22 (second output element of the automatic transmission 20). Moreover, the second ring gear 22r of the second planetary gear 22 functions as a fixable element of the second planetary gear 22 (first fixable element of the automatic transmission 20).

The third planetary gear 23 included in the compound planetary gear train 25 includes a third sun gear 23s that is an external gear, a third ring gear 23r that is an internal gear disposed concentrically with the third sun gear 23s, a plurality of third pinion gears 23p each meshing with the third sun gear 23s and the third ring gear 23r, and a third carrier 23c for rotatably and revolvably holding the third pinion gears 23p. In the present embodiment, a gear ratio $\lambda 3$ (the number of teeth of the third sun gear 23s/the number of teeth of the third ring gear 23*r*) of the third planetary gear 23 is set so that, for example, $\lambda 3=0.581$.

The fourth planetary gear 24 included in the compound planetary gear train 25 includes a fourth sun gear 24*s* that is an external gear, a fourth ring gear 24*r* that is an internal gear disposed concentrically with the fourth sun gear 24*s*, a plurality of fourth pinion gears 24*p* each meshing with the fourth sun gear 24*s* and the fourth ring gear 24*r*, and a fourth carrier 24*c* for rotatably and revolvably holding the fourth pinion gears 24*p*. In the present embodiment, a gear ratio $\lambda 4$ (the number of teeth of the fourth sun gear 24*s*/the number of teeth of the fourth ring gear 24*r*) of the fourth planetary gear 24 is set so that, for example, $\lambda 4=0.378$.

As shown in FIG. 1, the third sun gear 23*s* of the third planetary gear 23 and the fourth sun gear 24*s* of the fourth planetary gear 24 are integrally connected (always connected) to each other, and both rotate or stop always (and concentrically) together with each other. The third sun gear 23*s* and the fourth sun gear 24*s* thus always connected to each other function as a fixable element of the compound planetary gear train 25 (second fixable element of the automatic transmission 20). As shown in FIG. 1, the third carrier 23*c* of the third planetary gear 23 is always connected (fixed) to the input shaft 20*i*, and always connected to the first carrier 21*c* of the first planetary gear 21 via the intermediate shaft 20*m* serving as a connecting member (second connecting member). As a result, the power from the engine or the like is always transmitted to the third carrier 23*c* via the input shaft 20*i* while the power is transmitted from the engine or the like to the input shaft 20*i*. Thus, the third carrier 23*c* functions as the input element of the compound planetary gear train 25 (second input element of the automatic transmission 20). Moreover, as shown in FIG. 1, the third ring gear 23*r* of the third planetary gear 23 and the fourth carrier 24*c* of the fourth planetary gear 24 are integrally connected (always connected) to each other, and both rotate or stop always (and concentrically) always with each other. The third ring gear 23*r* and the fourth carrier 24*c* thus always connected to each other function as a first output element of the compound planetary gear train 25. The fourth ring gear 24*r* of the fourth planetary gear 24 functions as a second output element of the compound planetary gear train 25.

The clutch C1 connects and disconnects the first ring gear 21*r* serving as the output element of the first planetary gear 21 to and from the output shaft 20*o*. In the present embodiment, the clutch C1 is disposed on a side closer to the vehicle rear side (right side in FIGS. 1 and 2) than the first planetary gear 21 so as to be closest to the output shaft 20*o* among the above-mentioned six engagement elements consisting of the clutches C1 to C4 and the brakes B1 and B2. The clutch C2 connects and disconnects the second ring gear 22*r* of the second planetary gear 22 to and from the third ring gear 23*r* and the fourth carrier 24*c* serving as the first output element of the compound planetary gear train 25. In the present embodiment, the clutch C2 is disposed between the second planetary gear 22 and the compound planetary gear train 25 (third planetary gear 23) so as to be close to the second planetary gear 22.

The clutch C3 connects and disconnects the first sun gear 21*s* of the first planetary gear 21 and the second sun gear 22*s* of the second planetary gear 22 to and from the fourth ring gear 24*r* serving as the second output element of the compound planetary gear train 25. In the present embodiment, the clutch C3 is disposed so as to surround at least a part of the third planetary gear 23. The clutch C4 connects and disconnects the first sun gear 21*s* of the first planetary gear 21 and the second sun gear 22*s* of the second planetary gear 22 to and from the third ring gear 23*r* and the fourth carrier 24*c* serving as the first output element of the compound planetary gear train 25. In the present embodiment, the clutch C4 is disposed between the clutch C2 and the clutch C3 so as to be close to the compound planetary gear train 25 (third planetary gear 23).

The brake B1 non-rotatably holds (connects) the second ring gear 22*r* serving as the fixable element of the second planetary gear 22 stationary to the transmission case 11 and releases the second ring gear 22*r* from the transmission case 11 serving as the stationary member such that the second ring gear 22*r* is rotatable. In the present embodiment, the brake B1 is arranged so as to surround at least a part of the clutch C2. The brake B2 non-rotatably holds (connects) the third sun gear 23*s* and the fourth sun gear 24*s* serving as the fixable element of the compound planetary gear train 25 stationary to the transmission case 11 serving as the stationary member and releases both the sun gears from the transmission case 11 such that both the sun gears are rotatable. In the present embodiment, the brake B2 is arranged so as to surround at least a part of the fourth planetary gear 24.

The present embodiment employs, as each of the clutches C1 to C4, a multi-plate friction hydraulic clutch (friction engagement element) that includes, a piston, a plurality of friction engagement plates (friction plates and separator plates), and a hydraulic servo constituted by, for example, an engagement oil chamber to which hydraulic oil is supplied. The present embodiment also employs, as each of the brakes B1 and B2, a multi-plate friction hydraulic brake that includes, a piston, a plurality of friction engagement plates (friction plates and separator plates), and a hydraulic servo constituted by, for example, an engagement oil chamber to which the hydraulic oil is supplied. The clutches C1 to C4 and the brakes B1 and B2 operate in response to supply and discharge of the hydraulic oil by the hydraulic pressure control device 60.

Figure 3:
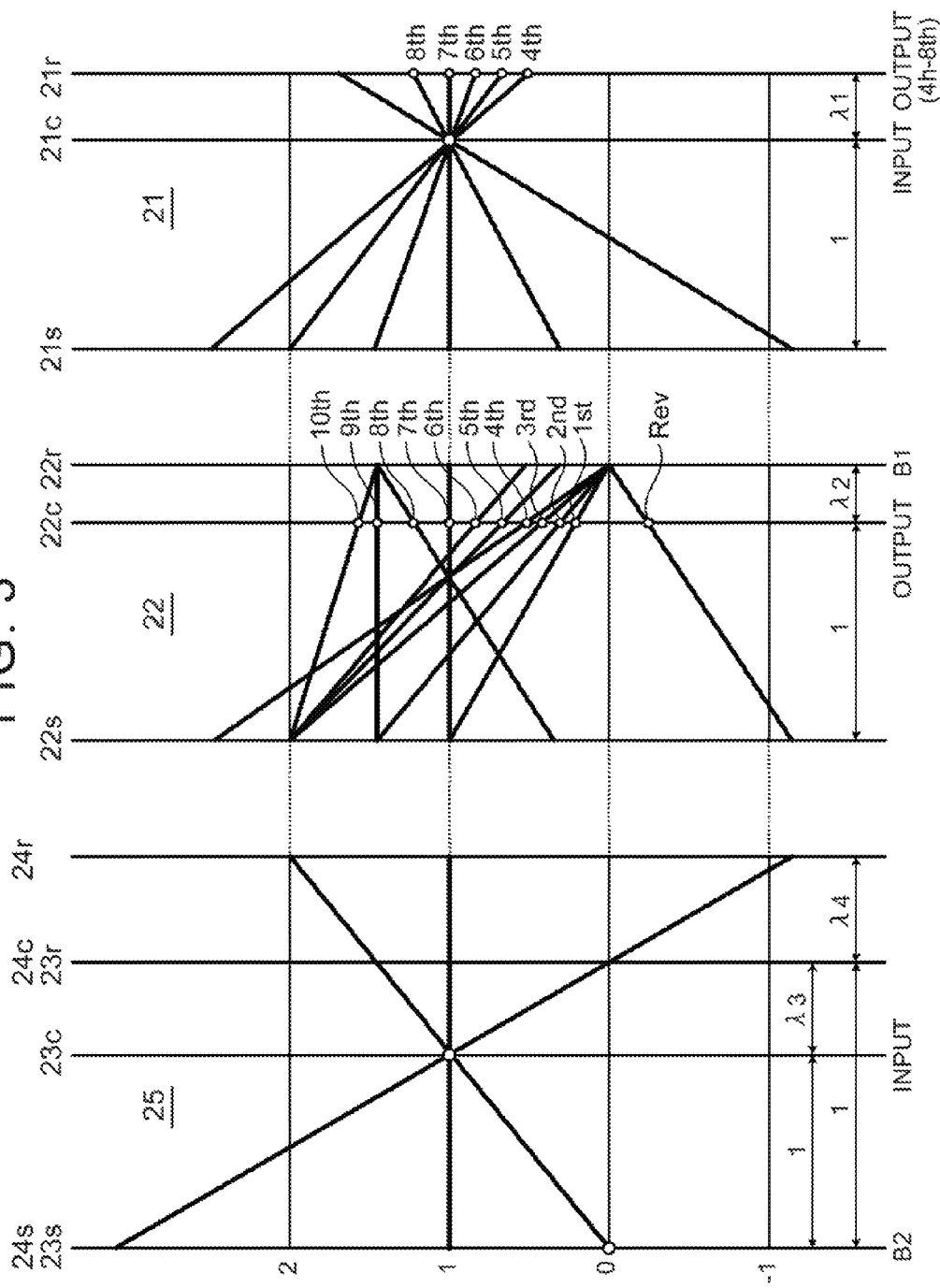
FIG. 3 shows velocity diagrams representing ratios of respective rotational speeds of rotational elements to an input rotational speed in the transmission device according to the present disclosure.

FIG. 3 shows velocity diagrams representing ratios of rotational speeds of rotational elements to the rotational speed (input rotational speed) of the input shaft 20*i* in the automatic transmission 20 (where the rotational speed of the input shaft 20*i*, that is, of the first carrier 21*c* and the third carrier 23*c*, is assumed to have a value of 1). FIG. 4 is an operation table showing relations of respective shift speeds with operating states of the clutches C1 to C4 and the brakes B1 and B2 in the automatic transmission 20.

As shown in FIG. 3, in a velocity diagram of the first planetary gear 21 (velocity diagram on the right side in FIG. 3), the three rotational elements, that is, the first sun gear 21*s*, the first ring gear 21*r*, and the first carrier 21*c*, constituting the single-pinion type first planetary gear 21 are arranged side by side from the left side in the velocity diagram, in the order of the first sun gear 21*s*, the first carrier 21*c*, and the first ring gear 21*r*, at intervals corresponding to the gear ratio $\lambda 1$. According to the above-listed order of arrangement in the velocity diagram, the first sun gear 21*s* is referred to as a first rotational element of the automatic transmission 20, the first carrier 21*c* is referred to as a second rotational element of the automatic transmission 20, and the first ring gear 21*r* is referred to as a third rotational element of the automatic transmission 20, in the present disclosure. Accordingly, the first planetary gear 21 includes the first rotational element, the second rotational element, and the third rotational element of the automatic transmission 20 that are sequentially arranged side by side at intervals corresponding to the gear ratio $\lambda 1$ in the velocity diagram.

In a velocity diagram of the second planetary gear 22 (velocity diagram at the center in FIG. 3), the three rotational elements, that is, the second sun gear 22s, the second ring gear 22r, and the second carrier 22c, constituting the single-pinion type second planetary gear 22 are arranged from the left side in the velocity diagram, in the order of the second sun gear 22s, the second carrier 22c, and the second ring gear 22r, at intervals corresponding to the gear ratio λ2. According to the above-listed order of arrangement in the velocity diagram, the second sun gear 22s is referred to as a fourth rotational element of the automatic transmission 20, the second carrier 22c is referred to as a fifth rotational element of the automatic transmission 20, and the second ring gear 22r is referred to as the sixth rotational element of the automatic transmission 20, in the present disclosure. Accordingly, the second planetary gear 22 includes the fourth rotational element, the fifth rotational element, and the sixth rotational element of the automatic transmission 20 that are sequentially arranged at intervals corresponding to the gear ratio λ2 in the velocity diagram.

Moreover, in a velocity diagram of the compound planetary gear train 25 (velocity diagram on the left side in FIG. 3), the four rotational elements, that is, the third sun gear 23s and the fourth sun gear 24s serving as the fixable element, the third carrier 23c serving as the input element, the third ring gear 23r and the fourth carrier 24c serving as the first output element, and the fourth ring gear 24r serving as the second output element, constituting the Simpson compound planetary gear train 25 are arranged in this order from the left side in the velocity diagram, at intervals corresponding to the gear ratios λ3 and λ4 of the third and the fourth planetary gears 23 and 24. According to the above-listed order of arrangement in the velocity diagram, the third sun gear 23s and the fourth sun gear 24s are referred to as a seventh rotational element of the automatic transmission 20, the third carrier 23c is referred to as an eighth rotational element of the automatic transmission 20, the third ring gear 23r and the fourth carrier 24c are referred to as a ninth rotational element of the automatic transmission 20, and the fourth ring gear 24r is referred to as a tenth rotational element of the automatic transmission 20, in the present disclosure. Accordingly, the compound planetary gear train 25 includes the seventh rotational element, the eighth rotational element, the ninth rotational element, and the tenth rotational element of the automatic transmission 20 that are sequentially arranged at intervals corresponding to the gear ratios λ3 and λ4 in the velocity diagram.

The automatic transmission 20 changes the connection relation of the first to the tenth rotational elements (practically a total of nine rotational elements because the first and the fourth rotational elements are always connected to each other) described above by engaging or disengaging the clutches C1 to C4 and the brakes B1 and B2 as shown in FIG. 4, thus, being capable of establishing ten power transmission paths in the forward rotational direction and one power transmission path in the reverse rotational direction, that is, first to tenth forward speeds and a reverse speed, between the input shaft 20i and the output shaft 20o.

Specifically, the first forward speed is established by engaging the clutches C3 and C4 and the brake B1, and disengaging the remaining engagement elements, that is, the clutches C1 and C2 and the brake B2. More specifically, the first forward speed is established as follows: the clutch C3 connects the first sun gear 21s of the first planetary gear 21 and the second sun gear 22s of the second planetary gear 22 to the fourth ring gear 24r (second output element) of the compound planetary gear train 25; the clutch C4 connects the first sun gear 21s of the first planetary gear 21 and the second sun gear 22s of the second planetary gear 22 to the third ring gear 23r and the fourth carrier 24c (first output element) of the compound planetary gear train 25; and the brake B1 non-rotatably holds the second ring gear 22r (fixable element) of the second planetary gear 22 stationary to the transmission case 11. In the present embodiment (when the gear ratios of the first to the fourth planetary gears 21 to 24 are such that λ1=0.277, λ2=0.244, λ3=0.581, and λ4=0.378, the same applies hereafter), a gear ratio (the rotational speed of the input shaft 20i/the rotational speed of the output shaft 20o) γ1 at the first forward speed results in 5.091.

The second forward speed is established by engaging the clutch C4 and the brakes B1 and B2, and disengaging the remaining engagement elements, that is, the clutches C1, C2, and C3. Specifically, the second forward speed is established as follows: the clutch C4 connects the first sun gear 21s of the first planetary gear 21 and the second sun gear 22s of the second planetary gear 22 to the third ring gear 23r and the fourth carrier 24c (first output element) of the compound planetary gear train 25; the brake B1 non-rotatably holds the second ring gear 22r (fixable element) of the second planetary gear 22 stationary to the transmission case 11; and the brake B2 non-rotatably holds the third sun gear 23s and the fourth sun gear 24s (fixable element) of the compound planetary gear train 25 stationary to the transmission case 11. In the present embodiment, a gear ratio γ2 at the second forward speed results in 3.219. A step ratio γ1/γ2 of 1.581 is obtained between the first forward speed and the second forward speed.

The third forward speed is established by engaging the clutch C3 and the brakes B1 and B2, and disengaging the remaining engagement elements, that is, the clutches C1, C2, and C4. Specifically, the third forward speed is established as follows: the clutch C3 connects the first sun gear 21s of the first planetary gear 21 and the second sun gear 22s of the second planetary gear 22 to the fourth ring gear 24r (second output element) of the compound planetary gear train 25; the brake B1 non-rotatably holds the second ring gear 22r (fixable element) of the second planetary gear 22 stationary to the transmission case 11; and the brake B2 non-rotatably holds the third sun gear 23s and the fourth sun gear 24s (fixable element) of the compound planetary gear train 25 stationary to the transmission case 11. In the present embodiment, a gear ratio γ3 at the third forward speed results in 2.337. A step ratio γ2/γ3 of 1.378 is obtained between the second forward speed and the third forward speed.

The fourth forward speed is established by engaging the clutch C1 and the brakes B1 and B2, and disengaging the remaining engagement elements, that is, the clutches C2, C3, and C4. Specifically, the fourth forward speed is established as follows: the clutch C1 connects the first ring gear 21r (output element) of the first planetary gear 21 to the output shaft 20o; the brake B1 non-rotatably holds the second ring gear 22r (fixable element) of the second planetary gear 22 stationary to the transmission case 11; and the brake B2 non-rotatably holds the third sun gear 23s and the fourth sun gear 24s (fixable element) of the compound planetary gear train 25 stationary to the transmission case 11. In the present embodiment, a gear ratio γ4 at the fourth forward speed results in 1.886. A step ratio γ3/γ4 of 1.239 is obtained between the third forward speed and the fourth forward speed.

The fifth forward speed is established by engaging the clutches C1 and C3 and the brake B2, and disengaging the remaining engagement elements, that is, the clutches C2 and C4 and the brake B1. Specifically, the fifth forward speed is established as follows: the clutch C1 connects the first ring gear 21r (output element) of the first planetary gear 21 to the output shaft 20o; the clutch C3 connects the first sun gear 21s of the first planetary gear 21 and the second sun gear 22s of the second planetary gear 22 to the fourth ring gear 24r (second output element) of the compound planetary gear train 25; and the brake B2 non-rotatably holds the third sun gear 23s and the fourth sun gear 24s (fixable element) of the compound planetary gear train 25 stationary to the transmission case 11. In the present embodiment, a gear ratio γ5 at the fifth forward speed results in 1.484. A step ratio γ4/γ5 of 1.271 is obtained between the fourth forward speed and the fifth forward speed.

The sixth forward speed is established by engaging the clutches C1 and C4 and the brake B2, and disengaging the remaining engagement elements, that is, the clutches C2 and C3 and the brake B1. Specifically, the sixth forward speed is established as follows: the clutch C1 connects the first ring gear 21r (output element) of the first planetary gear 21 to the output shaft 20o; the clutch C4 connects the first sun gear 21s of the first planetary gear 21 and the second sun gear 22s of the second planetary gear 22 to the third ring gear 23r and the fourth carrier 24c (first output element) of the compound planetary gear train 25; and the brake B2 non-rotatably holds the third sun gear 23s and the fourth sun gear 24s (fixable element) of the compound planetary gear train 25 stationary to the transmission case 11. In the present embodiment, a gear ratio γ6 at the sixth forward speed results in 1.192. A step ratio γ5/γ6 of 1.245 is obtained between the fifth forward speed and the sixth forward speed.

The seventh forward speed is established by engaging the clutches C1, C2, and C4, and disengaging the remaining engagement elements, that is, the clutch C3 and the brakes B1 and B2. Specifically, the seventh forward speed is established as follows: the clutch C1 connects the first ring gear 21r (output element) of the first planetary gear 21 to the output shaft 20o; the clutch C2 connects the second ring gear 22r of the second planetary gear 22 to the third ring gear 23r and the fourth carrier 24c (first output element) of the compound planetary gear train 25; and the clutch C4 connects the first sun gear 21s of the first planetary gear 21 and the second sun gear 22s of the second planetary gear 22 to the third ring gear 23r and the fourth carrier 24c (first output element) of the compound planetary gear train 25. In the present embodiment, a gear ratio γ7 at the seventh forward speed results in 1.000. A step ratio γ6/γ7 of 1.192 is obtained between the sixth forward speed and the seventh forward speed.

The eighth forward speed is established by engaging the clutches C1 and C2 and the brake B2, and disengaging the remaining engagement elements, that is, the clutches C3 and C4 and the brake B1. Specifically, the eighth forward speed is established as follows: the clutch C1 connects the first ring gear 21r (output element) of the first planetary gear 21 to the output shaft 20o; the clutch C2 connects the second ring gear 22r of the second planetary gear 22 to the third ring gear 23r and the fourth carrier 24c (first output element) of the compound planetary gear train 25; and the brake B2 non-rotatably holds the third sun gear 23s and the fourth sun gear 24s (fixable element) of the compound planetary gear train 25 stationary to the transmission case 11. In the present embodiment, a gear ratio γ8 at the eighth forward speed results in 0.785. A step ratio γ7/γ8 of 1.273 is obtained between the seventh forward speed and the eighth forward speed.

The ninth forward speed is established by engaging the clutches C2 and C4 and the brake B2, and disengaging the remaining engagement elements, that is, the clutches C1 and C3 and the brake B1. Specifically, the ninth forward speed is established as follows: the clutch C2 connects the second ring gear 22r of the second planetary gear 22 to the third ring gear 23r and the fourth carrier 24c (first output element) of the compound planetary gear train 25; the clutch C4 connects the first sun gear 21s of the first planetary gear 21 and the second sun gear 22s of the second planetary gear 22 to the third ring gear 23r and the fourth carrier 24c (first output element) of the compound planetary gear train 25; and the brake B2 non-rotatably holds the third sun gear 23s and the fourth sun gear 24s (fixable element) of the compound planetary gear train 25 stationary to the transmission case 11. In the present embodiment, a gear ratio γ9 at the ninth forward speed results in 0.632. A step ratio γ8/γ9 of 1.242 is obtained between the eighth forward speed and the ninth forward speed.

The tenth forward speed is established by engaging the clutches C2 and C3 and the brake B2, and disengaging the remaining engagement elements, that is, the clutches C1 and C4 and the brake B1. Specifically, the tenth forward speed is established as follows: the clutch C2 connects the second ring gear 22r of the second planetary gear 22 to the third ring gear 23r and the fourth carrier 24c (first output element) of the compound planetary gear train 25; the clutch C3 connects the first sun gear 21s of the first planetary gear 21 and the second sun gear 22s of the second planetary gear 22 to the fourth ring gear 24r (second output element) of the compound planetary gear train 25; and the brake B2 non-rotatably holds the third sun gear 23s and the fourth sun gear 24s (fixable element) of the compound planetary gear train 25 stationary to the transmission case 11. In the present embodiment, a gear ratio γ10 at the tenth forward speed results in 0.589. A step ratio γ9/γ10 of 1.074 is obtained between the ninth forward speed and the tenth forward speed. A spread γ1/γ10 (gear ratio range=the gear ratio γ1 of the first forward speed as the lowest shift speed/the gear ratio γ10 of the tenth forward speed as the highest shift speed) of 8.648 is obtained in the automatic transmission 20.

The reverse speed is established by engaging the clutches C2 and C3 and the brake B1, and disengaging the remaining engagement elements, that is, the clutches C1 and C4 and the brake B2. Specifically, the reverse speed is established as follows: the clutch C2 connects the second ring gear 22r of the second planetary gear 22 to the third ring gear 23r and the fourth carrier 24c (first output element) of the compound planetary gear train 25; the clutch C3 connects the first sun gear 21s of the first planetary gear 21 and the second sun gear 22s of the second planetary gear 22 to the fourth ring gear 24r (second output element) of the compound planetary gear train 25; and the brake B1 non-rotatably holds the second ring gear 22r (fixable element) of the second planetary gear 22 stationary to the transmission case 11. In the present embodiment, a gear ratio γrev at the reverse speed results in −4.954. A step ratio |γrev/γ1| of 0.973 is obtained between the first forward speed and the reverse speed.

As described above, the automatic transmission 20 can provide the first to the tenth forward speeds and the reverse speed by engaging or disengaging the clutches C1 to C4 and the brakes B1 and B2. As a result, the automatic transmission 20 can improve the fuel economy of the vehicle particularly at high speeds and the acceleration performance at each of the shift speeds by employing a larger spread (8.648 in the present embodiment), and can also improve the shift feel by employing appropriate step ratios (by keeping the step ratios from increasing). Thus, the automatic transmission 20 can favorably improve both the fuel economy and the drivability of the vehicle.

The automatic transmission 20 establishes the first to the tenth forward speeds and the reverse speed by engaging any three of the six engagement elements, that is, the clutches C1 to C4 and the brakes B1 and B2, and disengaging the remaining three engagement elements. This feature can reduce the number of engagement elements that are disengaged as each of the shift speeds is established, compared with that of, for example, a transmission that establishes the shift speeds by engaging two of the six clutches and brakes and disengaging the remaining four engagement elements. As a result, the transmission efficiency of power in the automatic transmission 20 can be further improved by reducing dragging losses caused by slight contact between members in the engagement elements that are disengaged as each of the shift speeds is established.

Moreover, in the automatic transmission 20, the first carrier 21c (second rotational element) of the first planetary gear 21 is always connected to the input shaft 20i via the intermediate shaft 20m in the same manner as the third carrier 23c (input element) of the compound planetary gear train 25, and, when each of the fourth to eighth forward speeds is established, the clutch C1 connects the first ring gear 21r (third rotational element) of the first planetary gear 21 to the output shaft 20o (the second carrier 22c of the second planetary gear 22). This feature can reduce the torque distributed to the clutch C1 compared with that of a clutch that selectively connects the first carrier (second rotational element) to the input shaft, for example, in a transmission in which the first ring gear (third rotational element) of the first planetary gear is always connected to the output shaft together with the second carrier (fifth rotational element) of the second planetary gear, and the first carrier (second rotational element) of the first planetary gear is selectively connected to the input shaft (see FIG. 2 in U.S. Pat. No. 8,202,190).

In other words, the first carrier 21c of the first planetary gear 21 serves as the second rotational element that is always connected to the input shaft 20i, and the first ring gear 21r of the first planetary gear 21 serves as the third rotational element that is selectively connected to the output shaft 20o by the clutch C1, so that the torque transmitted via the engaged clutch C1 is reduced (to $1/(1+\lambda 1)$) compared with that of the clutch that selectively connects the first carrier to the input shaft, for example, in the transmission in which the first ring gear of the first planetary gear is always connected to the output shaft together with the second carrier of the second planetary gear 22, and the first carrier of the first planetary gear is selectively connected to the input shaft. Thus, the automatic transmission 20 can favorably reduce the torque distributed to the clutch C1. As a result, the clutch C1 in the automatic transmission 20 can be reduced in size in at least one of the axial direction and the radial direction. Thus, the automatic transmission 20 can improve both the transmission efficiency of power and the drivability, and the overall size of the device can be kept from increasing.

The single-pinion type planetary gears are employed as the first and the second planetary gears 21 and 22, so that, compared with a case of employing, for example, double-pinion type planetary gears as the first and the second planetary gears 21 and 22, this structure can reduce meshing losses between the rotational elements in the first and the second planetary gears 21 and 22 to improve the transmission efficiency of power of the automatic transmission 20, and can reduce the number of components to improve assemblability while keeping the overall weight of the device from increasing. Moreover, as in the case of the automatic transmission 20 described above, employing the Simpson (SS-CR type) compound planetary gear train 25 including the two single-pinion type third and fourth planetary gears 23 and 24 can reduce meshing losses between the rotational elements of the compound planetary gear train 25 to improve the transmission efficiency of power of the automatic transmission 20, and can reduce the number of components to improve the assemblability while keeping the overall weight of the device from increasing.

Subsequently, the specific structure of the automatic transmission 20 will be described in detail.

Figure 5:
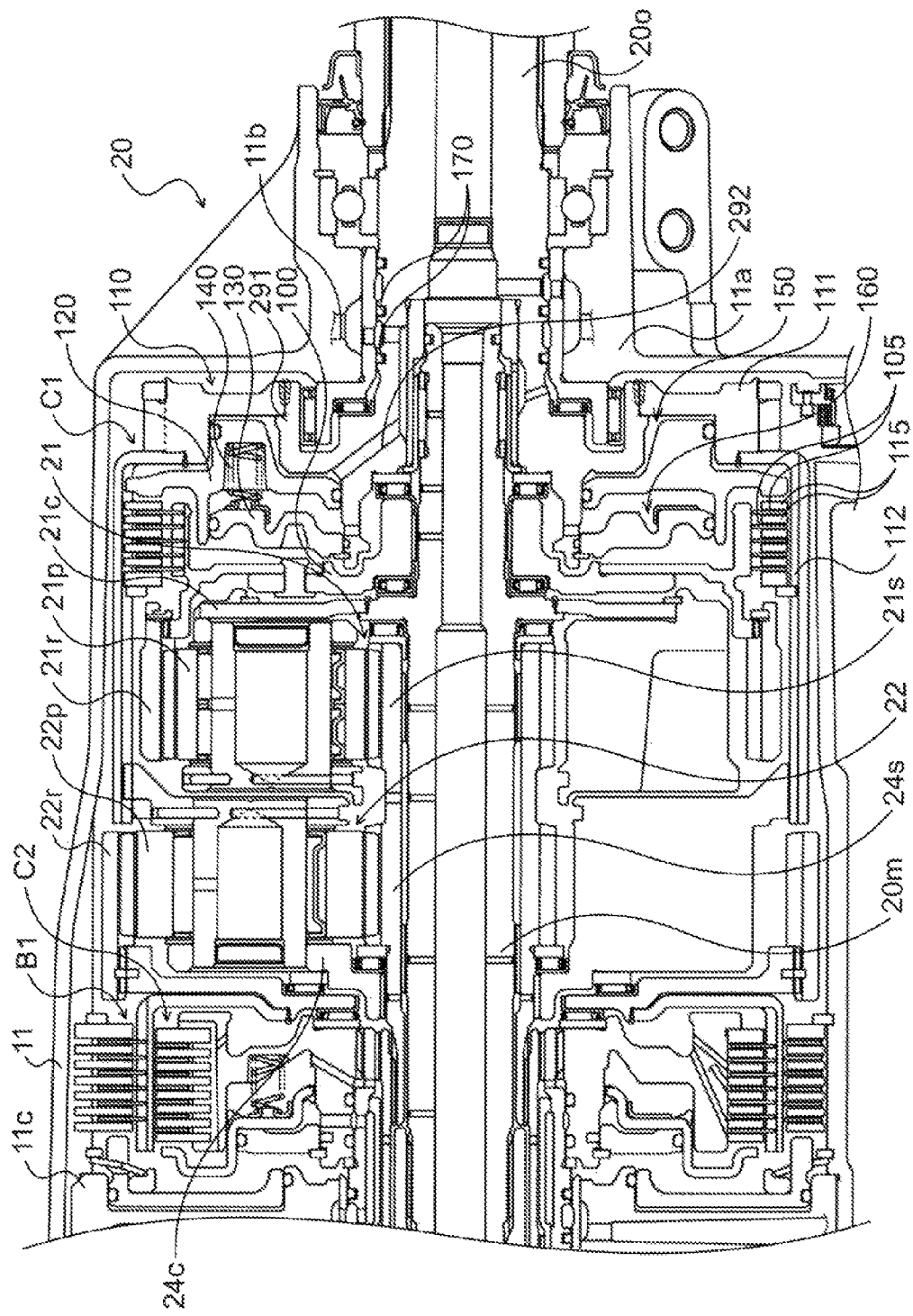
FIG. 5 is a sectional view showing the transmission device according to the present disclosure.

The clutch C1 of the automatic transmission 20 will first be described with reference to FIG. 5. As shown in FIG. 5, the clutch C1 of the automatic transmission 20 includes a clutch hub 100, a clutch drum 110, a plurality of friction plates (first friction engagement plates) 105 that are fitted at inner circumferences thereof to the clutch hub 100 and are movably supported by the clutch hub 100, and a plurality of separator plates (second friction engagement plates) 115 that are fitted at outer circumferences thereof to the clutch drum 110 and are movably supported by the clutch drum 110. The clutch hub 100 of the clutch C1 is rotatably supported by the intermediate shaft 20m via a radial bearing, and supported in the axial direction by a flange formed on the intermediate shaft 20m and the output shaft 20o via two thrust bearings disposed at the front and the rear of the clutch hub 100. Moreover, the clutch hub 100 is fixed to the first ring gear 21r of the first planetary gear 21 via splines and a snap ring, and rotates or stops always together (and concentrically) with the first ring gear 21r. Each of the friction plates 105 fitted to the clutch hub 100 is structured by attaching friction materials to both surfaces of an annular member.

The clutch drum 110 of the clutch C1 includes an annular wall portion 111 fixed by welding or the like to an increased diameter portion 291 provided on the output shaft 20o, and also includes an outer cylinder portion 112 joined by welding or the like to the outer circumference of the annular wall portion 111 and extending along the axial direction of the output shaft 20o and other components. The inner circumferential surface of the outer cylinder portion 112 is provided with splines engaging with the outer circumferences of the separator plates 115. A free end of the outer cylinder portion 112 is fixed to the second carrier 22c of the second planetary gear 22 via the splines and a snap ring. With this structure, the clutch drum 110 rotates or stops always together (and concentrically) with the output shaft 20o and the second carrier 22c of the second planetary gear 22. Each of the separator plates 115 fitted to the clutch drum 110 is an annular member both surfaces of which are smoothed.

Moreover, the clutch C1 includes a piston 120 that presses the separator plates 115 and the friction plates 105 to frictionally engage them with each other, a cancel plate (cancel oil chamber defining member) 130, and a plurality of return springs 140. The piston 120 is axially movably supported by the output shaft 20o so as to be located inside the outer cylinder portion 112 of the clutch drum 110 on a side closer to the first planetary gear 21 (vehicle front side) than the annular wall portion 111, and defines an engagement oil chamber 150 in conjunction with the clutch drum 110 and the output shaft 20o serving as oil chamber defining portions. The cancel plate 130 is mounted on the output shaft 20o so as to be located on a side closer to the first planetary gear 21 (vehicle front side) than the piston 120, and defines, in conjunction with the piston 120, a cancel oil chamber 160 for canceling centrifugal hydraulic pressure produced in the engagement oil chamber 150. The return springs 140 are arranged with spaces therebetween in the circumferential direction between the piston 120 and the cancel plate 130.

As shown in FIG. 5, the output shaft 20o is rotatably supported, via a sleeve, a radial bearing, and a thrust bearing, by a shaft support portion 11a provided on the transmission case 11. An in-case oil passage 11b connected to the hydraulic pressure control device 60 is formed in the shaft support portion 11a of the transmission case 11, and engagement hydraulic pressure (hydraulic oil) is supplied from the hydraulic pressure control device 60 to the clutch C1 through the in-case oil passage 11b. Moreover, an oil passage 292 is formed near the increased diameter portion 291 of the output shaft 20o so as to directly communicate with the engagement oil chamber 150 of the clutch C1 and communicate with the in-case oil passage 11b of the transmission case 11. Two seal members 170 are disposed between the shaft support portion 11a of the transmission case 11 and the output shaft 20o so as to sandwich a communicating portion between the in-case oil passage 11b and the oil passage 292 from the front and the rear.

With this structure, the engagement oil chamber 150 of the clutch C1 is supplied with the engagement hydraulic pressure from the hydraulic pressure control device 60 through the in-case oil passage 11b of the transmission case 11 and the oil passage 292 of the output shaft 20o. As the hydraulic pressure in the engagement oil chamber 150 increases, the piston 120 moves in the axial direction of the output shaft 20o, and presses the separator plates 115 and the friction plates 105, so that the clutch C1 is engaged to connect the first ring gear 21r of the first planetary gear 21 to the output shaft 20o. Note that the cancel oil chamber 160 of the clutch C1 is supplied with hydraulic oil (such as drained oil for lubrication and cooling) from the hydraulic pressure control device 60 through oil passages formed, for example, in the transmission case 11 and the output shaft 20o.

In this way, the clutch drum 110 serving as an oil chamber defining portion integrally rotating with the output shaft 20o, the piston 120, and the output shaft 20o can define the engagement oil chamber 150 in the clutch C1 that selectively connects the first ring gear 21r of the first planetary gear 21 to the output shaft 20o connected to the rear wheels of the vehicle via the differential gear. Moreover, in the clutch C1, the oil passage 292 for supplying the engagement hydraulic pressure to the engagement oil chamber 150 is formed in the output shaft 20o to allow the engagement oil chamber 150 to directly communicate with the oil passage 292 of the output shaft 20o.

As a result, the automatic transmission 20 need not supply the engagement hydraulic pressure from the compound planetary gear train 25 side (vehicle front side) to the engagement oil chamber 150 of the clutch C1 through a long oil passage formed in the input shaft 20i and the intermediate shaft 20m, and can easily supply the engagement hydraulic pressure from the output shaft 20o side (vehicle rear side) to the engagement oil chamber 150. For example, in a transmission in which a clutch selectively connects the first carrier of the first planetary gear to the input shaft, members for defining the engagement oil chamber of the clutch are provided in the input shaft (intermediate shaft) side, so that an oil passage formed in the output shaft needs to communicate with an oil passage formed in the input shaft (intermediate shaft). This structure increases the number of seal members (seal portions). In such a transmission, the amount of leak of the hydraulic oil may increase or dragging losses of the seal members may increase by an amount corresponding to the increase in the number of seal members in the communicating portion between the oil passage of the input shaft (intermediate shaft) and the oil passage of the output member. In contrast, in the automatic transmission 20, the engagement oil chamber 150 of the clutch C1 can directly communicate with the oil passage 292 of the output shaft 20o, so that the increase in the amount of leak of the hydraulic oil and the increase in the dragging losses of the seal members 170 can be favorably suppressed by reducing the number of the seal members 170 (sealed parts).

Figure 6:
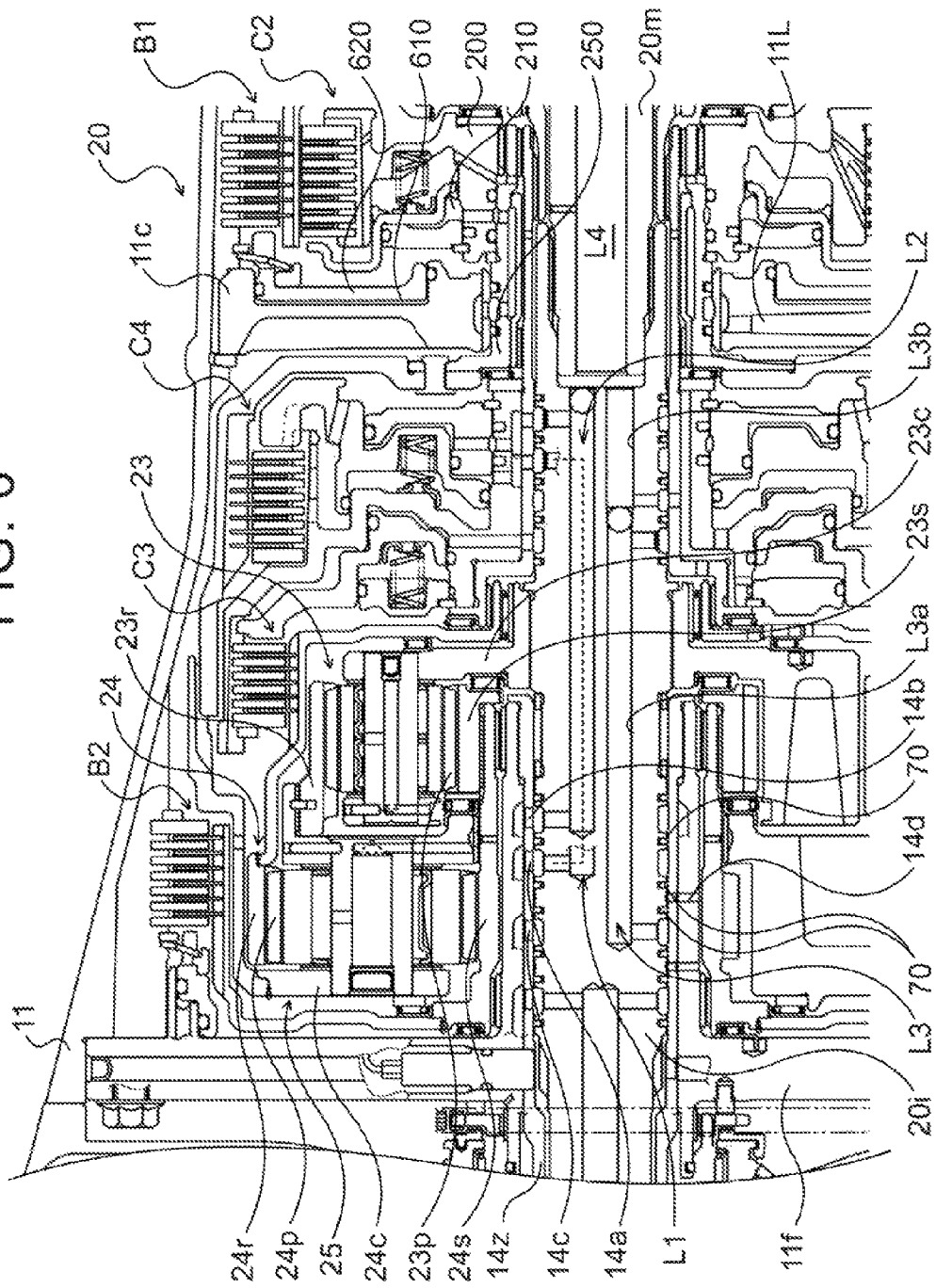
FIG. 6 is another sectional view showing the transmission device according to the present disclosure.
Figure 7:
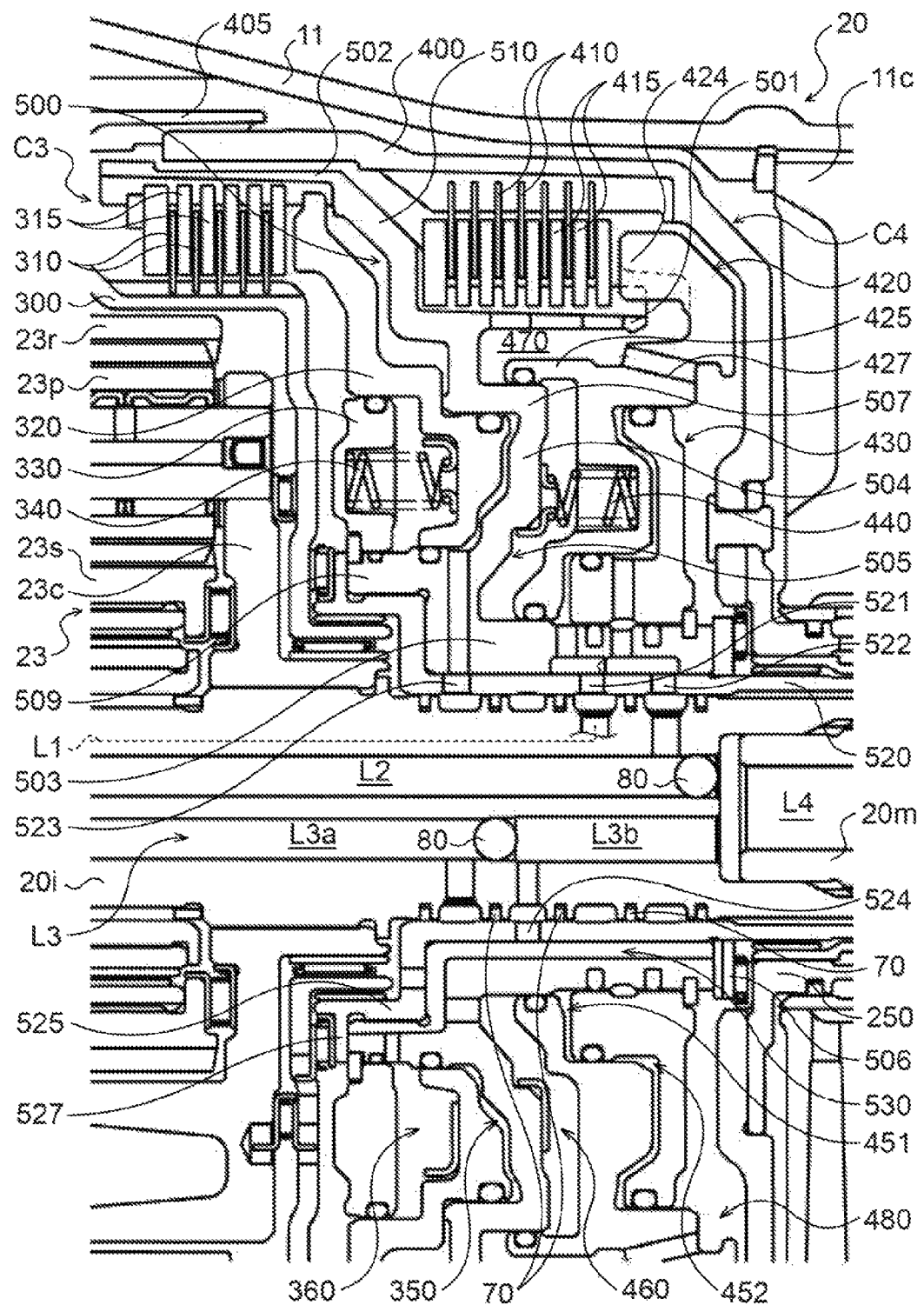
FIG. 7 is an enlarged sectional view showing the transmission device according to the present disclosure.
Figure 8:
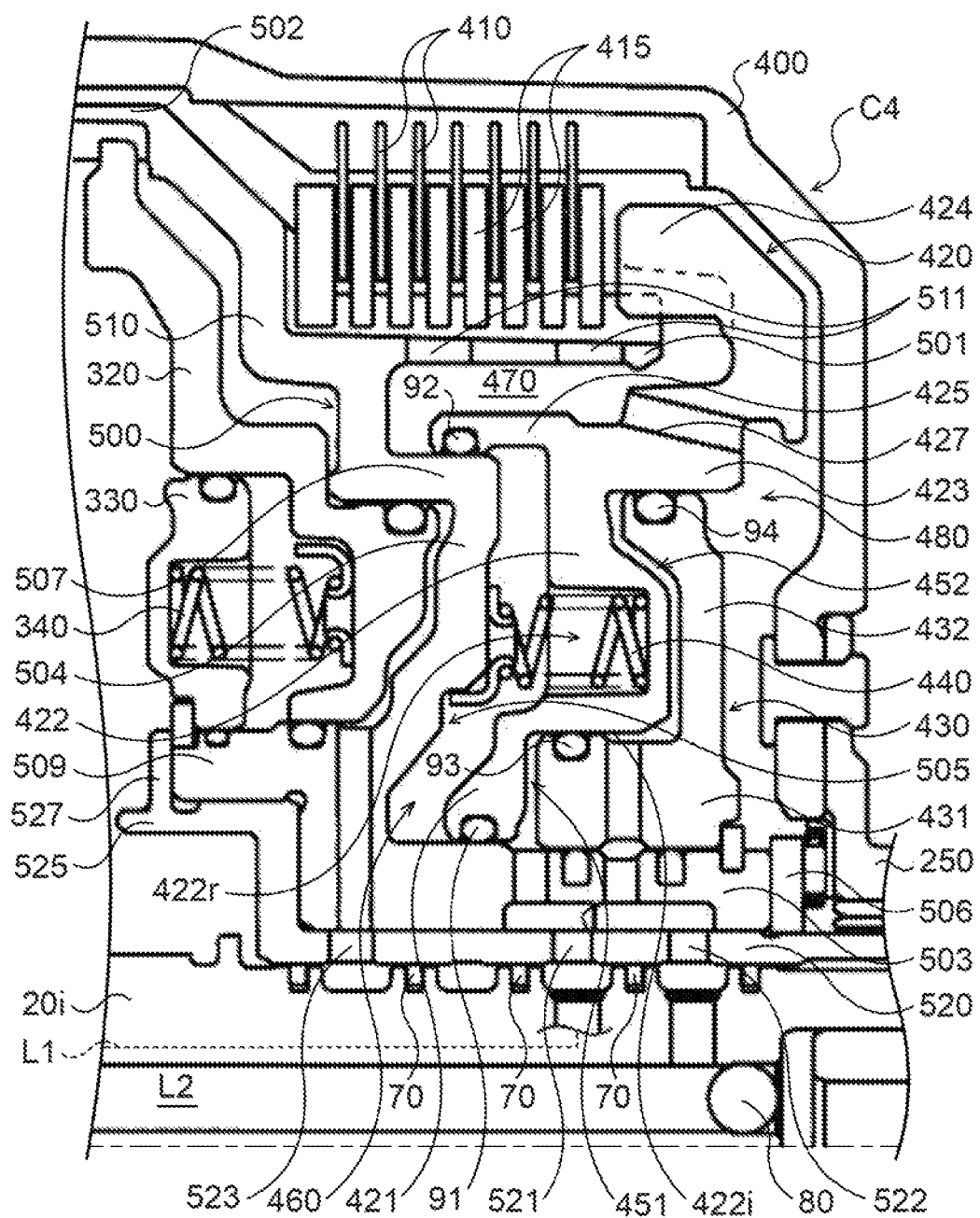
FIG. 8 is another enlarged sectional view showing the transmission device according to the present disclosure.

Next, the following will describe the clutches C3 and C4 of the automatic transmission 20 with reference to FIGS. 6 to 8. As shown in FIGS. 6 to 8, the clutches C3 and C4 share a hub member 500 that is connected to the first sun gear 21s of the first planetary gear 21 and the second sun gear 22s of the second planetary gear 22, and that serves as a clutch drum of the clutch C3 and a clutch hub of the clutch C4. The hub member 500 includes a hub body 510 and a sleeve member 520 that is fitted (spigot-fitted) to the hub body 510.

The hub body 510 of the hub member 500 includes a first cylindrical portion 501 having splines on the outer circumference thereof, a second cylindrical portion 502 having splines on the inner circumference thereof, a substantially cylindrical inner cylinder portion 503, and an annular portion 505 that extends radially outward from the inner cylinder portion 503 and includes an annular wall portion 504 supporting the first and the second cylindrical portions 501 and 502. The first cylindrical portion 501 extends in the axial direction (rightward in FIGS. 7 and 8) from the outer circumference of the annular wall portion 504 constituting the annular portion 505 so as to surround the inner cylinder portion 503. The second cylindrical portion 502 extends from the outer circumference of the annular wall portion 504 toward the side opposite to the first cylindrical portion 501 in the axial direction.

As shown in FIGS. 7 and 8, the annular wall portion 504 of the annular portion 505 is formed so as to project from the second cylindrical portion 502 side toward the first cylindrical portion 501 side, and includes an annular projecting portion 507 having an outer circumferential surface facing the inner circumferential surface of the first cylindrical portion 501 with a space therebetween. Moreover, a cylindrical extending portion 509 having a diameter larger than that of the inner cylinder portion 503 and smaller than that of the projecting portion 507 extends from an end surface on the second cylindrical portion 502 side (end surface on the left side in FIGS. 7 and 8) of the annular wall portion 504 constituting the annular portion 505, toward the side opposite to the first cylindrical portion 501 and the inner cylinder portion 503 so as to be located inside the second cylindrical portion 502.

The sleeve member 520 of the hub member 500 is fitted into the inner cylinder portion 503 constituting the annular portion 505 so as to rotate together with the hub body 510, and is rotatably supported on the outer circumferential surface of the input shaft 20i. As shown in FIGS. 7 and 8, the sleeve member 520 includes, on one end side thereof (on the left side in FIGS. 7 and 8), a sleeve-side increased diameter portion 525 fitted into the cylindrical extending portion 509 of the annular portion 505 of the hub body 510. In the present embodiment, serrations are formed on the inner circumferential surface of the cylindrical extending portion 509 of the annular portion 505 and on the outer circumferential surface of the sleeve-side increased diameter portion 525. The cylindrical extending portion 509, that is, the hub body 510, is connected to the sleeve-side increased diameter portion 525, that is, the sleeve member 520 via the serrations so as to be axially immovable with respect to each other and rotatable together with each other. Moreover, an annular flange 527 extends outward from the outer circumferential surface of the sleeve-side increased diameter portion 525 so as to be in contact with one end surface (end surface on the left side in FIGS. 7 and 8) of the cylindrical extending portion 509 of the annular portion 505. The other end of the sleeve member 520 is connected to the first sun gear 21s of the first planetary gear 21 and the second sun gear 22s of the second planetary gear 22, as shown, for example, in FIG. 2. The sleeve member 520 rotatably supports the connecting sleeve 250 (to be described later).

Using the hub member 500 functioning as the clutch drum of the clutch C3 and the clutch hub of the clutch C4 can reduce the arrangement space of the clutches C3 and C4 so as to favorably keep the size of the automatic transmission 20 from increasing. In the hub member 500, the first and the second cylindrical portions 501 and 502, and in addition, a part of the annular projecting portion 507 and cylindrical extending portion 509 respectively function as ribs, so that the strength of the hub member 500 can be further increased. This feature can result in favorable reduction of increase in thickness and cost of the hub member 500, that is, increase in size and cost of the automatic transmission 20, associated with securing of sufficient strength of the hub member 500.

The clutch C3 using the hub member 500 as the clutch drum includes a clutch hub 300 having splines on the outer circumference thereof, a plurality of friction plates (first friction engagement plates) 310 that are fitted (spline-fitted) at inner circumferences thereof to the clutch hub 300 and are movably supported by the clutch hub 300, and a plurality of separator plates (second friction engagement plates) 315 that are fitted at outer circumferences thereof to the second cylindrical portion 502 of the hub member 500 serving as the clutch drum and are movably supported by the hub member 500 (second cylindrical portion 502). Moreover, the clutch C3 includes a piston 320 that presses the separator plates 315 and the friction plates 310 to frictionally engage them with each other, a cancel plate (cancel oil chamber defining member) 330, and a plurality of return springs 340.

The clutch hub 300 of the clutch C3 is rotatably supported by the third carrier 23c of the third planetary gear 23 fixed to the input shaft 20i via, for example, a radial bearing, and supported in the axial direction by the third carrier 23c and the hub member 500 (sleeve member 520) via two thrust bearings disposed at the front and the rear of the clutch hub 300. In the present embodiment, the inner cylinder portion of the clutch hub 300 is disposed, together with the radial bearing and a part of the third carrier 23c, inside the sleeve-side increased diameter portion 525 of the sleeve member 520 constituting the hub member 500. This arrangement can keep the axial length of the automatic transmission 20 from increasing. The clutch hub 300 is fixed by welding or the like to the fourth ring gear 24r of the fourth planetary gear 24, and rotates or stops always together (and concentrically) with the fourth ring gear 24r. Each of the friction plates 310 fitted to the clutch hub 300 is structured by attaching friction materials to both surfaces of an annular member. Each of the separator plates 315 fitted to the second cylindrical portion 502 of the hub member 500 is an annular member both surfaces of which are smoothed.

The piston 320 is axially movably supported by the cylindrical extending portion 509 of the hub member 500 and the splines of the second cylindrical portion 502 inside the second cylindrical portion 502 of the hub body 510 (hub member 500), and defines, in conjunction with the annular wall portion 504 (back surface of the projecting portion 507) of the hub member 500, an engagement oil chamber 350 of the clutch C3 supplied with the engagement hydraulic pressure. The cancel plate 330 is mounted near the distal end (end on the left side in FIGS. 7 and 8) of the cylindrical extending portion 509 of the hub body 510 (hub member 500), and defines, in conjunction with the piston 320, a cancel oil chamber (second cancel oil chamber) 360 for canceling centrifugal hydraulic pressure produced in the engagement oil chamber 350. In addition, the return springs 340 are arranged with spaces therebetween in the circumferential direction between the piston 320 and the cancel plate 330.

The clutch C4 using the hub member 500 as the clutch hub includes a clutch drum 400 having splines on the inner circumference thereof, a plurality of friction plates (second friction engagement plates) 410 that are fitted (spline-fitted) at outer circumferences thereof to the clutch drum 400 and are movably supported by the clutch drum 400, and a plurality of separator plates (first friction engagement plates) 415 that are fitted (spline-fitted) at outer circumferences thereof to the first cylindrical portion 501 of the hub member 500 serving as the clutch hub and are movably supported by the hub member 500 (first cylindrical portion 501). Moreover, the clutch C4 includes a piston 420 that presses the separator plates 415 and the friction plates 410 to frictionally engage them with each other, an oil chamber defining member 430, and a plurality of return springs 440.

The clutch drum 400 of the clutch C4 is connected (engagingly fitted) to a connecting member 405 fixed by welding or the like to the fourth carrier 24c of the fourth planetary gear 24, and rotates or stops always together (and concentrically) with the fourth carrier 24c. The clutch drum 400 is connected to a clutch hub 200 of the clutch C2 (see FIG. 6), and is fixed by rivets to the connecting sleeve 250 via bushes (bearings). Note that, as shown in FIG. 8, an annular plate 506 and a thrust bearing are disposed between the connecting sleeve 250 and the inner cylinder portion 503 of the hub member 500. With this arrangement, the hub member 500 is supported by the connecting sleeve 250 and the clutch hub 300 of the clutch C3 via the thrust bearings disposed at the front and the rear of the hub member 500.

Each of the friction plates 410 fitted to the clutch drum 400 is structured by attaching friction materials to both surfaces of an annular member. Each of the separator plates 415 fitted to the first cylindrical portion 501 of the hub member 500 is an annular member both surfaces of which are smoothed. The piston 420 is axially movably supported by the inner cylinder portion 503 inside the first cylindrical portion 501 of the hub body 510 (hub member 500). The oil chamber defining member 430 is formed into an annular shape, and is mounted on the distal end (end on the right side in FIGS. 7 and 8) of the inner cylinder portion 503 so as to be located on a side closer to a center support (center wall) 11c than the piston 420. Note that the center support 11c is fixed to the transmission case 11 so as to be located between the compound planetary gear train 25 and the second planetary gear 22 (and the first planetary gear 21).

The piston 420 and the oil chamber defining member 430 define a first engagement oil chamber 451 and a second engagement oil chamber 452, each of which is independently supplied with engagement hydraulic pressure (hydraulic oil). Specifically, in the automatic transmission 20 of the present embodiment, a relatively large difference occurs between the maximum value and the minimum value of the torque distributed to the clutch C4 while being engaged. Therefore, the clutch C4 is provided with the first and the second engagement oil chambers 451 and 452 each independently supplied with the engagement hydraulic pressure so as to apply appropriate engagement hydraulic pressure to the piston 420, regardless of the level of the torque distributed. In the present embodiment, the first engagement oil chamber 451 is defined by the piston 420 and the hub member 500 so as to be located closer to the input shaft 20$i$ than the second engagement oil chamber 452. The chamber diameter of the first engagement oil chamber 451 (the pressure receiving area of the piston 420 in the first engagement oil chamber 451) is smaller than the chamber diameter of the second engagement oil chamber 452 (the pressure receiving area of the piston 420 in the second engagement oil chamber 452).

As shown in FIG. 8, the piston 420 of the clutch C4 includes an annular first pressure receiving portion 421 facing the first engagement oil chamber 451 and a second pressure receiving portion 422 that extends radially outward from the outer circumference of the first pressure receiving portion 421, projects in the axial direction, and faces the second engagement oil chamber. The first pressure receiving portion 421 is axially movably supported by the inner cylinder portion 503 of the hub body 510 (hub member 500). A seal member 91 is interposed between the inner cylinder portion 503 and the first pressure receiving portion 421. As shown in FIG. 8, an annular recess 422$r$ opening toward the annular wall portion 504 of the hub body 510 (hub member 500) (on the side of the first pressure receiving portion 421) is formed on the second pressure receiving portion 422. One end side of each of the return springs 440 is inserted (accommodated) in the annular recess 422$r$. The other end of each of the return springs 440 is supported by the annular wall portion 504 of the hub body 510 (hub member 500) via a spring seat.

Moreover, the piston 420 includes an outer cylinder portion 423 extending in the axial direction from the outer circumference of the second pressure receiving portion 422 so as to be away from the first pressure receiving portion 421 (rightward in FIG. 8), an annular pressing portion 424 extending from the outer cylinder portion 423 so as to be capable of abutting on the separator plates 415 fitted to the first cylindrical portion 501 of the hub member 500, and a cylindrical extending portion 425 formed so as to project from the outer circumference of the second pressure receiving portion 422 toward a side opposite to the outer cylinder portion 423. As shown in FIG. 8, the cylindrical extending portion 425 projects from the outer circumference of the second pressure receiving portion 422 toward the annular wall portion 504 of the hub body 510 (hub member 500), and the projecting portion 507 formed at the annular wall portion 504 is fitted into the cylindrical extending portion 425. The inner circumferential surface of the cylindrical extending portion 425 slidingly contacts the outer circumferential surface of the projecting portion 507 formed at the annular wall portion 504 of the hub body 510. A seal member 92 is interposed between the cylindrical extending portion 425 and the projecting portion 507.

The oil chamber defining member 430 includes an annular base portion 431 that is press-fitted and fixed with a snap ring to the inner cylinder portion 503 of the hub body 510 (hub member 500), and also includes an annular wall portion 432 extending radially outward from the annular base portion 431. The annular base portion 431 of the oil chamber defining member 430 is fitted to (the inside of) the second pressure receiving portion 422 so as to slidingly contact an inner circumferential surface 422$i$ of the second pressure receiving portion 422 of the piston 420. A seal member 93 is interposed between the annular base portion 431 and the second pressure receiving portion 422 of the piston 420. Moreover, the outer circumferential surface of the annular wall portion 432 of the oil chamber defining member 430 slidingly contacts the inner circumferential surface of the outer cylinder portion 423 of the piston 420. A seal member 94 is interposed between the annular wall portion 432 and the outer cylinder portion 423.

In this way, the annular base portion 431 of the oil chamber defining member 430 defines, in conjunction with the first pressure receiving portion 421, the first engagement oil chamber 451 inside the inner circumferential surface 422$i$ of the second pressure receiving portion 422 of the piston 420. The annular wall portion 432 of the oil chamber defining member 430 defines, in conjunction with the second pressure receiving portion 422, the second engagement oil chamber 452 inside the inner circumferential surface of the outer cylinder portion 423 of the piston 420. As a result, as shown in FIGS. 7 and 8, the first engagement oil chamber 451 is defined inside the second engagement oil chamber 452 at a location offset from the second engagement oil chamber 452 toward the annular wall portion 504 of the hub member 500 (leftward in FIGS. 7 and 8) so as to be away from the second engagement oil chamber 452 in the axial direction of the piston 420, that is, in the direction in which the piston 420 presses the separator plates 415 to the friction plates 410. The return springs 440 are arranged with spaces therebetween in the circumferential direction between the piston 420 and the annular wall portion 504 of the hub body 510 (hub member 500) so as to surround the first engagement oil chamber 451 and the annular base portion 431 of the oil chamber defining member 430. The return springs 440 are arranged side by side in the axial direction (overlap each other when viewed from the axial direction) with the second engagement oil chamber 452, and are arranged side by side in the radial direction (overlap each other when viewed from the radial direction) with the first engagement oil chamber 451. Note that, in the present embodiment, the first and the second engagement oil chambers 451 and 452 are defined so as not to overlap each other when viewed from the radial direction, but may be defined so as to partially overlap each other when viewed from the radial direction.

Moreover, as shown in FIGS. 7 and 8, an annular space 470 is defined between the first cylindrical portion 501 of the hub body 510 (hub member 500) and the cylindrical extending portion 425 of the piston 420. A hydraulic oil communicating space (oil passage) 480 is defined between the clutch drum 400 of the clutch C4 and the back surface (surface on the right side in FIGS. 7 and 8) of the piston 420. A plurality of oil holes (through holes) 427 for communicating the space 470 between the first cylindrical portion 501 and the cylindrical extending portion 425 with the hydraulic oil communicating space 480 are formed, for example, at even intervals in the piston 420 so as to be located outside (on a side closer to the first cylindrical portion 501 than is) the first and the second engagement oil chambers 451 and 452.

As described above, in the clutch C4 of the automatic transmission 20, the axial length of the clutch C4 can be reduced by preventing the return springs 440 from being arranged side by side in the pressing direction (axial direction) of the piston 420 with both the first and the second engagement oil chambers 451 and 452. This arrangement can result in improvement in mountability of the clutch C4 to the automatic transmission 20, and reduction in the arrangement space of the clutch C4. By using the piston 420 including the first and the second pressure receiving portions 421 and 422 and the outer cylinder portion 423 as described above, the return springs 440 can be disposed so as to surround the first engagement oil chamber 451 located inside and be arranged side by side in the radial direction with the first engagement oil chamber 451, and so as to be arranged side by side in the axial direction with the second engagement oil chamber 452 located outside. Moreover, by using the oil chamber defining member 430 including the annular base portion 431 and the annular wall portion 432, the clutch C4 can be shortened and the first and the second engagement oil chambers 451 and 452 can be defined by the piston 420 and the oil chamber defining member 430.

As described above, in the clutch C4, the projecting portion 507 formed at the annular wall portion 504 of the hub body 510 is fitted into the cylindrical extending portion 425, and the inner circumferential surface of the cylindrical extending portion 425 slidingly contacts the outer circumferential surface of the projecting portion 507. With this structure, the hub member 500 and the piston 420 define, inside the inner circumferential surface of the cylindrical extending portion 425, a cancel oil chamber 460 (first cancel oil chamber) for canceling centrifugal hydraulic pressure produced in the first and the second engagement oil chambers 451 and 452. In this way, a sufficient chamber diameter of the cancel oil chamber 460 (a sufficient pressure receiving area and the centrifugal hydraulic pressure in the cancel oil chamber 460) can be secured by defining the cancel oil chamber 460 inside the inner circumferential surface of the cylindrical extending portion 425 slidingly contacting the outer circumferential surface of the projecting portion 507.

Subsequently, the following will describe an oil passage structure of the automatic transmission 20 for supplying the hydraulic oil to the engagement oil chamber 350 and the cancel oil chamber 360 of the clutch C3 and to the first and the second engagement oil chambers 451 and 452 and the cancel oil chamber 460 of the clutch C4. In the automatic transmission 20, the hydraulic oil (engagement hydraulic pressure) from the hydraulic pressure control device 60 is supplied from the vehicle front side to the engagement oil chamber 350 of the clutch C3 and the first and the second engagement oil chambers 451 and 452 of the clutch C4 through oil passages formed in a front support (support member) 11f (see FIGS. 2 and 6) fixed to the transmission case 11 and the input shaft 20i. The hydraulic oil (such as the drained oil for lubrication and cooling) from the hydraulic pressure control device 60 is supplied from the vehicle rear side to the cancel oil chambers 360 and 460 of the clutches C3 and C4 through the output shaft 20o and the intermediate shaft 20m.

As shown in FIGS. 6 and 7, a first in-shaft oil-passage L1 for supplying the hydraulic oil to the first engagement oil chamber 451 of the clutch C4, a second in-shaft oil-passage L2 for supplying the hydraulic oil to the second engagement oil chamber 452 of the clutch C4, and a third in-shaft oil-passage L3 for supplying the hydraulic oil to the engagement oil chamber 350 of the clutch C3 are formed in the input shaft 20i. Each of the first and the second in-shaft oil-passages L1 and L2 corresponding to the clutch C4 is drilled from an end on the intermediate shaft 20m side (right side, for example, in FIG. 6) to the vicinity of the central part in the longitudinal direction of the input shaft 20i, and includes an axial oil passage blocked on the intermediate shaft 20m side by a blocking member 80 and two radial oil passages extending from near both ends of the axial oil passage.

In the same way as the first and the second in-shaft oil-passages L1 and L2, the third in-shaft oil-passage L3 corresponding to the clutch C3 also includes an axial oil passage drilled from the end on the intermediate shaft 20m side to the vicinity of the central part in the longitudinal direction of the input shaft 20i. However, as shown in FIGS. 6 and 7, the axial oil passage of the third in-shaft oil-passage L3 is divided into two halves, that is, a front axial oil-passage L3a and a rear axial oil-passage L3b, by another blocking member 80 disposed on a side closer to the vehicle front side than the blocking members 80 of the first and the second in-shaft oil-passages L1 and L2. The front axial oil-passage L3a communicates with two radial oil passages formed near both ends of the front axial oil-passage L3a. The rear axial oil-passage L3b communicates with one radial oil passage formed near the blocking member 80, that is, near the blocked end. An open end (right end, for example, in FIG. 7) of the rear axial oil-passage L3b communicates with an oil-passage L4 formed in the intermediate shaft 20m.

As shown in FIG. 6, the radial oil passage on the vehicle front side of the first in-shaft oil-passage L1 communicates with a first oil passage 14a formed in the stator shaft 14z that serves as a cylindrical member disposed between the front support 11f and the input shaft 20i such that the inner circumferential surface of the stator shaft 14z slidingly contacts the outer circumferential surface of the input shaft 20i. In addition, as shown in FIG. 6, the radial oil passage on the vehicle front side of the second in-shaft oil-passage L2 communicates with a second oil passage 14b formed in the stator shaft 14z. Furthermore, as shown in FIG. 6, the radial oil passage communicating with the front axial oil-passage L3a of the third in-shaft oil-passage L3 on the vehicle front side communicates with a third oil passage 14e formed in the stator shaft 14z.

The first to the third oil passages 14a to 14c of the stator shaft 14z are connected to respective corresponding oil passages (linear solenoid valves) of the hydraulic pressure control device 60 through oil passages formed, for example, in the front support 11f and the transmission case 11. With this structure, the hydraulic oil (engagement hydraulic pressure) fed with pressure from the hydraulic pressure control device 60 is supplied from the vehicle front side through the first in-shaft oil-passage L1, the second in-shaft oil-passage L2, and the front axial oil-passage L3a of the third in-shaft oil-passage L3 to the engagement oil chamber 350 of the clutch C3 and the first and the second engagement oil chambers 451 and 452 of the clutch C4.

As shown in FIG. 6, a first front communicating portion between the first in-shaft oil-passage L1 (radial oil passage) corresponding to the first engagement oil chamber 451 of the clutch C4 and the first oil passage 14a of the stator shaft 14z, a second front communicating portion between the second in-shaft oil-passage L2 (radial oil passage) corresponding to the second engagement oil chamber 452 of the clutch C4 and the second oil passage 14b of the stator shaft 14z, and a third front communicating portion between the front axial oil-passage L3a (radial oil passage communicating therewith) corresponding to the engagement oil chamber 350 of the clutch C3 and the third oil passage 14c of the stator shaft 14z are away from one another in the axial direction of the input shaft 20i. Specifically, the first to the third front communicating portions are arranged in the order of the third front communicating portion, the first front communicating portion, and the second front communicating portion from the vehicle front side in the automatic transmission 20.

As shown in FIG. 6, a single seal member 70 is interposed between the first front communicating portion corresponding to the first engagement oil chamber 451 of the clutch C4 and the second front communicating portion corresponding to the second engagement oil chamber 452 of the clutch C4 so as to seal a gap between the input shaft 20*i* and the stator shaft 14*z*. In addition, as shown in FIG. 6, two seal members 70 located axially away from each other are interposed between the first front communicating portion corresponding to the first engagement oil chamber 451 of the clutch C4 and the third front communicating portion corresponding to the engagement oil chamber 350 of the clutch C3 so as to seal the gap between the input shaft 20*i* and the stator shaft 14*z*. Furthermore, as shown in FIG. 6, a drain oil passage 14*d* is formed in the stator shaft 14*z*. The drain oil passage 14*d* opens inward, that is, toward the input shaft 20*i* between the two seal members 70 disposed between the first front communicating portion and the third front communicating portion, and communicates with the periphery of the compound planetary gear train 25 (third and fourth planetary gears 23 and 24) on the outside, that is, on the side of the front support 11*f*.

As shown in FIGS. 7 and 8, the radial oil passage on the vehicle rear side of the first hi-shaft oil-passage L1 communicates with a first oil passage 521 formed in the sleeve member 520 serving as a cylindrical member that constitutes the hub member 500 and is disposed such that the inner circumferential surface thereof slidingly contacts the outer circumferential surface of the input shaft 20*i*. In addition, as shown in FIGS. 7 and 8, the radial oil passage on the vehicle rear side of the second in-shaft oil-passage L2 communicates with a second oil passage 522 formed in the sleeve member 520. Furthermore, as shown in FIGS. 7 and 8, the radial oil passage communicating with the front axial oil-passage L3*a* of the third in-shaft oil-passage L3 on the vehicle rear side communicates with a third oil passage 523 formed in the sleeve member 520. The first to the third oil passages 521 to 523 formed in the sleeve member 520 communicate with the first engagement oil chamber 451, the second engagement oil chamber 452, and the engagement oil chamber 350, respectively corresponding thereto, through oil passages formed in the inner cylinder portion 503 of the hub body 510 of the hub member 500 and the oil chamber defining member 430.

As shown in FIGS. 7 and 8, a first rear communicating portion between the first in-shaft oil-passage L1 (radial oil passage) corresponding to the first engagement oil chamber 451 of the clutch C4 and the first oil passage 521 of the sleeve member 520, a second rear communicating portion between the second in-shaft oil-passage L2 (radial oil passage) corresponding to the second engagement oil chamber 452 of the clutch C4 and the second oil passage 522 of the sleeve member 520, and a third rear communicating portion between the front axial oil-passage L3*a* (radial oil passage communicating therewith) corresponding to the engagement oil chamber 350 of the clutch C3 and the third oil passage 523 of the sleeve member 520 are away from one another in the axial direction of the input shaft 20*i*. Specifically, the first to the third rear communicating portions are arranged in the order of the third rear communicating portion, the first rear communicating portion, and the second rear communicating portion from the vehicle front side in the automatic transmission 20.

As shown in FIGS. 7 and 8, a single seal member 70 is interposed between the first rear communicating portion corresponding to the first engagement oil chamber 451 of the clutch C4 and the second rear communicating portion corresponding to the second engagement oil chamber 452 of the clutch C4 so as to seal a gap between the input shaft 20*i* and the sleeve member 520 of the hub member 500. In addition, as shown in FIGS. 7 and 8, two seal members 70 located axially away from each other are interposed between the first rear communicating portion corresponding to the first engagement oil chamber 451 of the clutch C4 and the third rear communicating portion corresponding to the engagement oil chamber 350 of the clutch C3 so as to seal the gap between the input shaft 20*i* and the sleeve member 520. Furthermore, as shown in FIGS. 7 and 8, an oil passage 524 is formed in the sleeve member 520. The oil passage 524 opens inward, that is, toward the input shaft 20*i* between the two seal members 70 disposed between the first rear communicating portion and the third rear communicating portion, and communicates with a radial oil passage extending from the rear axial oil-passage L3*b* of the third in-shaft oil-passage L3 near the blocking member 80.

Moreover, an oil passage 530 is formed on the inner circumferential surfaces of the inner cylinder portion 503 and the cylindrical extending portion 509 of the hub body 510 constituting the hub member 500. The oil passage 530 extends in the axial direction of the input shaft 20*i* so as to communicate with the oil passage 524 of the sleeve member 520. As shown in FIG. 7, one end (left end in FIG. 7) of the oil passage 530 formed between the hub body 510 and the sleeve member 520 is blocked by the flange 527 abutting on the end surface (end surface on the left side in FIG. 7) of the cylindrical extending portion 509 of the hub body 510 (annular portion 505). In other words, when the sleeve member 520 is provided with the flange 527 abutting on the end surface of the cylindrical extending portion 509 of the hub body 510, the oil passage 530 can be easily formed with one end thereof blocked against the hub member 500. As shown in FIG. 7, the oil passage 530 communicates with both the cancel oil chamber 360 of the clutch C3 and the cancel oil chamber 460 of the clutch C4 through other oil passages formed in the hub member 500.

The open end (right end, for example, in FIG. 7) of the rear axial oil-passage L3*b* of the third in-shaft oil-passage L3 communicates with the oil-passage L4 formed in the intermediate shaft 20*m*. Moreover, the hydraulic oil (such as the drained oil for lubrication and cooling) from the hydraulic pressure control device 60 is supplied to the oil-passage L4 of the intermediate shaft 20*m* through oil passages formed, for example, in the transmission case 11 and the output shaft 20*o*. As a result, the hydraulic oil is supplied to the cancel oil chamber 360 of the clutch C3 and the cancel oil chamber 460 of the clutch C4, for example, through a region closer to the vehicle rear side than the blocking member 80 of the third in-shaft oil-passage L3, that is, through the rear axial oil-passage L3*b* and the oil passage 530 of the hub member 500.

The other end (right end in FIG. 7) of the oil passage 530 formed between the hub member 500 (that is, the hub body 510) and the sleeve member 520 communicates with the hydraulic oil communicating space 480 defined between the clutch drum 400 of the clutch C4 and the back surface of the piston 420 through oil grooves formed on the annular plate 506 described above. With this structure, the hydraulic oil supplied from the rear axial oil-passage L3*b* of the third in-shaft oil-passage L3 to the oil passage 530 is also supplied to the hydraulic oil communicating space 480. The hydraulic oil thus supplied is introduced into the space 470 defined between the first cylindrical portion 501 of the hub member 500 and the cylindrical extending portion 425 of the piston 420 through the oil holes 427 formed in the piston 420 of the clutch C4, and is supplied to the friction plates 410 through a plurality of oil holes 511 (see FIG. 8) formed in the first cylindrical portion 501 of the hub member 500 of the clutch C4.

Hence, in the clutch C4, the hydraulic oil supplied to the space 470 defined between the first cylindrical portion 501 and the cylindrical extending portion 425 of the piston 420 can be used for lubrication and cooling of the separator plates 415 fitted to the first cylindrical portion 501 and the friction plates 410 fitted to the clutch drum 400. Moreover, by defining the space 470 between the first cylindrical portion 501 and the cylindrical extending portion 425 of the piston 420 in this way, the oil holes 427 for introducing the hydraulic oil into the space 470 can be shorter in length and can be easily formed in the piston 420. This structure eliminates the necessity of forming long oblique holes in the hub member 500. As a result, the performance of the clutch C4 can be favorably secured, while improving the workability on the piston 420 of the clutch C4 and the hub member 500.

As described above, in the automatic transmission 20, the hydraulic oil (engagement hydraulic pressure) is supplied from the vehicle front side to the engagement oil chamber 350 of the clutch C3 and the first and the second engagement oil chambers 451 and 452 of the clutch C4 through the first in-shaft oil-passage L1, the second in-shaft oil-passage L2, and the third in-shaft oil-passage L3 (front axial oil-passage L3$a$) of the input shaft 20$i$. The third in-shaft oil-passage L3 is divided into two halves by the blocking member 80 placed in the mid portion thereof. The hydraulic oil is supplied to the cancel oil chambers 360 and 460 of the clutches C3 and C4 through the rear axial oil-passage L3$b$ on a side closer to the vehicle rear side than the blocking member 80 of the third in-shaft oil-passage L3.

In this way, the hydraulic oil can be supplied from the three first to third in-shaft oil-passages L1 to L3 formed in the input shaft 20$i$ to the five oil chambers, that is, the first and the second engagement oil chambers 451 and 452, the engagement oil chamber 350 of the clutch C3, and the cancel oil chambers 360 and 460. As a result, while four or more in-shaft oil-passages should normally be formed in the input shaft 20$i$, the number of the in-shaft oil-passages can be reduced to three to suppress the increase in cost associated with increase in the outside diameter of the input shaft 20$i$ and securing of sufficient strength, thereby suppressing the increase in size and cost of the automatic transmission 20.

The hydraulic oil is supplied to both the first and the second engagement oil chambers 451 and 452 when the clutch C4 is engaged. Hence, the clutch C4 is not practically hindered from normally operating even if a slight amount of hydraulic oil flows between the first and the second front communicating portions or between the first and the second rear communicating portions described above. For this reason, in the automatic transmission 20, a single seal member 70 is interposed at each of the places between the first and the second front communicating portions and between the first and the second rear communicating portions so as to seal the gaps between the input shaft 20$i$ and the stator shaft 14$z$ and between the input shaft 20$i$ and the sleeve member 520 of the hub member 500.

The clutch C3 and the clutch C4 are not always engaged at the same time. Hence, the hydraulic oil needs to be restrained from flowing between the first front communicating portion corresponding to the clutch C4 and the third front communicating portion corresponding to the clutch C3, and between the first rear communicating portion corresponding to the clutch C4 and the third rear communicating portion corresponding to the clutch C3. For this reason, in the automatic transmission 20, the two seal members 70 located axially away from each other are interposed at each of the places between the first and the third front communicating portions and between the first and the third rear communicating portions so as to seal the gaps between the input shaft 20$i$ and the stator shaft 14$z$ and between the input shaft 20$i$ and the sleeve member 520. Moreover, the drain oil passage 14$d$ opening between the two seal members 70 that are disposed between the first and the third front communicating portions is formed in the stator shaft 14$z$, and the oil passage 524 opening between the two seal members 70 that are disposed between the first and the third rear communicating portions is formed in the sleeve member 520.

In the automatic transmission 20 with this structure, the respective pairs of the seal members 70 favorably restrain the hydraulic oil from flowing between the first and the third front communicating portions and between the first and the third rear communicating portions. Moreover, if a slight amount of hydraulic oil leaks out of the first or third front communicating portion to the place therebetween, the automatic transmission 20 can collect the leaked hydraulic oil into the drain oil passage 14$d$ formed in the stator shaft 14$z$ and guide the collected hydraulic oil to a place other than the first and the third front communicating portions, that is, to the periphery of the compound planetary gear train 25 (third and fourth planetary gears 23 and 24). If a slight amount of hydraulic oil leaks out of the first or third rear communicating portion to the place therebetween, the automatic transmission 20 can collect the leaked hydraulic oil into the oil passage 524 formed in the sleeve member 520 and guide the collected hydraulic oil, for example, to the cancel oil chambers 360 and 460 and the hydraulic oil communicating space 480. As a result, the automatic transmission 20 can smoothly operate the clutches C3 and C4 without increasing the number of the seal members 70 required associated with the supply of the hydraulic oil to the clutch C3 including the single engagement oil chamber 350 and to the clutch C4 including the first and the second engagement oil chambers 451 and 452 that are independent of each other.

As shown in FIG. 3, when the third sun gear 23$s$ and the fourth sun gear 24$s$ serving as the fixable element are non-rotatably held stationary by the brake B2, the compound planetary gear train 25 of the automatic transmission 20 increases the speed of the power transmitted to the third carrier 23$c$ serving as the input element, and transmits the resultant power to the third ring gear 23$r$ and the fourth carrier 24$c$ serving as the first output element and to the fourth ring gear 24$r$ serving as the second output element. The first and the second sun gears 21$s$ and 22$s$ (other rotational elements) of the first and the second planetary gears 21 and 22 are transmission targets of power through (fastening targets of) the clutches C3 and C4, and reach the highest maximum rotational speed among those of the rotational elements constituting the automatic transmission 20, as shown in FIG. 3.

Based on these features, in the automatic transmission 20, the clutch C3 for selectively connecting the fourth ring gear 24$r$ of the compound planetary gear train 25 to the first and the second sun gears 21$s$ and 22$s$ of the first and the second planetary gears 21 and 22 and the clutch C4 for selectively connecting the third ring gear 23$r$ and the fourth carrier 24$c$ of the compound planetary gear train 25 to the first and the second sun gears 21$s$ and 22$s$ of the first and the second planetary gears 21 and 22 are disposed on the input shaft 20$i$ on a side closer in the axial direction to the compound planetary gear train 25 than the first and the second planetary gears 21 and 22, as described above. In this way, the clutches C3 and C4 are disposed on the input shaft 20*i* on a side closer to the vehicle rear side (to the first and the second planetary gears 21 and 22) than the compound planetary gear train 25, so that the outer circumferences of the components, such as the hub member 500 functioning as the drum of the clutch C3 and the clutch hub of the clutch C4, the clutch hub 300 of the clutch C3, and the clutch drum 400 of the clutch C4 can be located closer to the input shaft 20*i* (axial center).

Hence, even if the maximum rotational speeds of, for example, the third ring gear 23*r* and the fourth carrier 24*c* that rotate at a high speed as the brake B2 is engaged, the hub member 500 of the clutches C3 and C4 that rotates together with the fourth ring gear 24*r*, the clutch hub 300, and the clutch drum 400 are high when the clutch C3 or C4 is engaged, centrifugal forces acting on these components, such as the hub member 500, can be kept from increasing. As a result, increases in sizes and costs of, for example, the hub member 500 of the clutches C3 and C4, the clutch hub 300, and the clutch drum 400 associated with securing of sufficient strength can be suppressed, thereby suppressing the increase in size and cost of the automatic transmission 20. Moreover, the outer circumferential surface of the input shaft 20*i* rotatably supports the hub member 500 (sleeve member 520) that is shared by the clutches C3 and C4, and that is connected to the first and the second sun gears 21*s* and 22*s* of the first and the second planetary gears 21 and 22, the first and the second sun gears 21*s* and 22*s* rotating at the highest-speed among the rotational elements constituting the automatic transmission 20. Thus, the outer circumferences of the hub member 500, that is, the first and the second cylindrical portions 501 and 502 can be located closer to the input shaft 20*i* (axial center) so as to keep a centrifugal force acting on the hub member 500 from increasing.

Note that, in the automatic transmission 20 described above, it is conceivable to supply the hydraulic oil (hydraulic pressure) from the front support 11*f* or the center support 11*c* to the engagement oil chamber 350 and the cancel oil chamber 360 of the clutch C3 and to the first and the second engagement oil chambers 451 and 452 and the cancel oil chamber 460 of the clutch C4, without passing the hydraulic oil, for example, through the input shaft 20*i* or the intermediate shaft 20*m*. If, however, the hydraulic oil (hydraulic pressure) is supplied from the front support 11*f* or the center support 11*c* to the engagement oil chamber 350, the first and the second engagement oil chambers 451 and 452, and the cancel oil chambers 360 and 460, the components, such as the clutch hub and the clutch drum of the clutches C3 and C4, need to be rotatably supported by a cylindrical portion formed on the front support 11*f* or the center support 11*c*, and the outer circumferences of the components are prevented from being located close to the input shaft 20*i* (axial center). For this reason, employing the oil passage structure using the input shaft 20*i* as described above is very useful for locating the outer circumferences of the components, such as the hub member 500 serving as the drum of the clutch C3 and the clutch hub of the clutch C4, the clutch hub 300 of the clutch C3, and the clutch drum 400 of the clutch C4, closer to the input shaft 20*i* (axial center).

Note that, as shown in FIG. 6, the hydraulic oil is supplied from a hydraulic oil supply passage 11L formed in the center support 11*c* to the hydraulic servo of the clutch C2, that is, to an engagement oil chamber 210 of the clutch C2, without passing through the input shaft 20*i*. This structure can suppress increase in the number of in-shaft oil-passages to be formed in the input shaft 20*i*, thereby reducing the diameters of the input shaft 20*i* and members disposed around the input shaft 20*i* so as to favorably keep the overall size of the automatic transmission 20 from increasing. As shown in FIG. 6, an engagement oil chamber 610 of the brake B1 is defined between the center support 11*c* and a piston 620 constituting the hydraulic servo of the brake B1 in conjunction with the engagement oil chamber.

As described above, the automatic transmission 20 can improve the transmission efficiency of power, that is, the fuel economy and the acceleration performance of the vehicle, by employing the larger spread, and can also improve the shift feel by employing the appropriate step ratios. The automatic transmission 20 can favorably reduce the torque distributed to the clutch C1, so that the clutch C1 can be reduced in size either in the axial direction or the radial direction. Thus, the automatic transmission 20 can improve both the transmission efficiency of power and the drivability, and the overall size of the device can be kept from increasing.

Moreover, in the automatic transmission 20, the clutch drum 110 serving as an oil chamber defining portion rotating together with the output shaft 20*o*, the piston 120, and the output shaft 20*o* define the engagement oil chamber 150 of the clutch C1, and the oil passage 292 for supplying the engagement hydraulic pressure to the engagement oil chamber 150 is formed in the output shaft 20*o* to allow the engagement oil chamber 150 to directly communicate with the oil passage 292 of the output shaft 20*o*. As a result, the automatic transmission 20 need not supply the engagement hydraulic pressure from the compound planetary gear train 25 side (vehicle front side) to the engagement oil chamber 150 of the clutch C1 through a long oil passage formed in the input shaft 20*i* and the intermediate shaft 20*m*, and can easily supply the engagement hydraulic pressure from the output shaft 20*o* side (vehicle rear side) to the engagement oil chamber 150. In the automatic transmission 20, the engagement oil chamber 150 of the clutch C1 can directly communicate with the oil passage 292 of the output shaft 20*o*, so that the increase in the amount of leak of the hydraulic oil and the increase in the dragging losses of the seal members 170 can be favorably suppressed by reducing the number of the seal members 170 (sealed parts).

In the automatic transmission 20, the axial length of the clutch C4 can be reduced to reduce the arrangement space thereof. Moreover, in the automatic transmission 20, the hub member 500 is structured to be shared by the clutches C3 and C4, so that the arrangement space of the clutch C3 can also be reduced. Thus, with the automatic transmission 20, the overall size of the device can be favorably kept from increasing. The automatic transmission 20 can smoothly operate the clutches C3 and C4 without increasing the number of the seal members 70 required associated with the supply of the hydraulic oil to the clutch C3 including the single engagement oil chamber 350 and to the clutch C4 including the first and the second engagement oil chambers 451 and 452 that are independent of each other. Moreover, with the automatic transmission 20, an increase in cost associated with increase in the outside diameter of the input shaft 20*i* and securing of sufficient strength can be suppressed, thereby suppressing the increase in overall size and overall cost of the device. In addition, with the automatic transmission 20, increases in the sizes and costs of, for example, the hub member 500 of the clutches C3 and C4, the clutch hub 300, and the clutch drum 400 associated with securing of sufficient strength can be suppressed, thereby suppressing the increase in size and cost of the automatic transmission 20.

Figure 9:
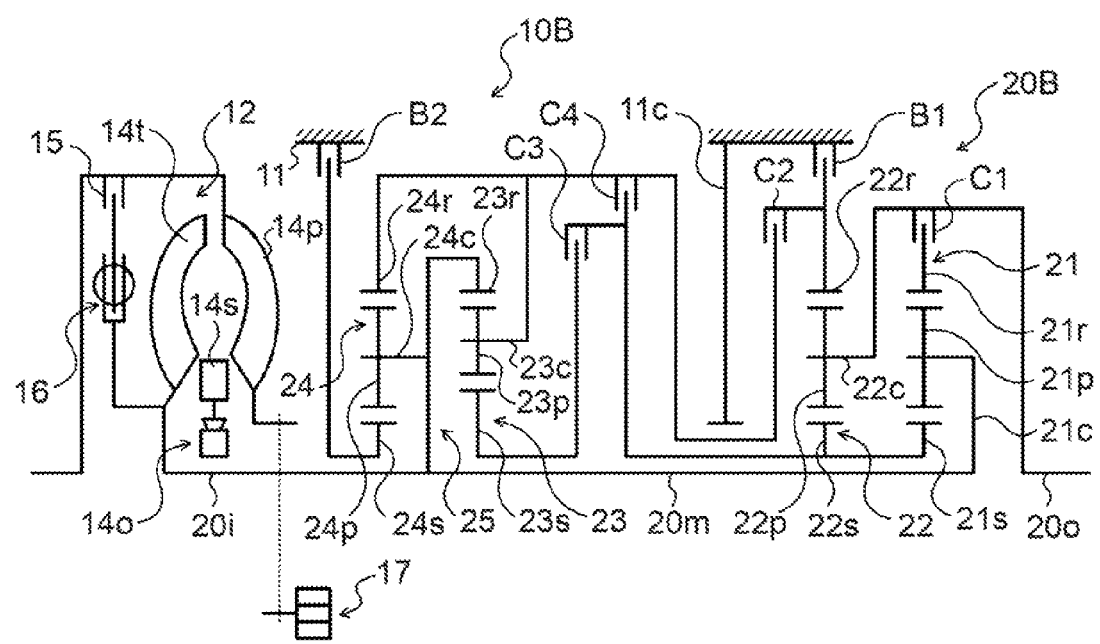
FIG. 9 is a schematic structure diagram of a power transmission device including a transmission device according to another embodiment of the present disclosure.

FIG. 9 is a schematic structure diagram of a power transmission device 10B including an automatic transmission 20B serving as a transmission device according to another embodiment of the present disclosure. The automatic transmission 20B in the power transmission device 10B shown in FIG. 9 corresponds to an automatic transmission obtained by replacing the Simpson compound planetary gear train 25 in the automatic transmission 20 described above with what is called a CR-CR type compound planetary gear train 25B including the two single-pinion type third and fourth planetary gears 23 and 24. Also in the case of the automatic transmission 20B employing the CR-CR type compound planetary gear train 25B in this way, the meshing losses between the rotational elements of the compound planetary gear train 25B can be reduced to improve the transmission efficiency of power, and the number of components can be reduced to improve the assemblability while keeping the overall weight of the device from increasing.

As shown in FIG. 9, in the automatic transmission 20B, the fourth sun gear 24s of the fourth planetary gear 24 functions as the fixable element of the compound planetary gear train 25B corresponding to the seventh rotational element (second fixable element) of the automatic transmission 20B. As shown in FIG. 6, the third ring gear 23r of the third planetary gear 23 and the fourth carrier 24c of the fourth planetary gear 24 are integrally connected (always connected) to each other, and connected (fixed) to the input shaft 20i. As a result, while the power is transmitted from the engine or the like to the input shaft 20i, the power from the engine or the like is always transmitted via the input shaft 20i to the third ring gear 23r and the fourth carrier 24c always connected to each other. Accordingly, the third ring gear 23r and the fourth carrier 24c function as the input element of the compound planetary gear train 25B corresponding to the eighth rotational element (second input element) of the automatic transmission 20B. Moreover, as shown in FIG. 6, the third carrier 23c of the third planetary gear 23 and the fourth ring gear 24r of the fourth planetary gear 24 are integrally connected (always connected) to each other, and both rotate or stop always together (and concentrically) with each other. The third carrier 23c and the fourth ring gear 24r thus always connected to each other function as the first output element of the compound planetary gear train 25B corresponding to the ninth rotational element (third output element) of the automatic transmission 20B. The third sun gear 23s of the third planetary gear 23 functions as the second output element of the compound planetary gear train 25B corresponding to the tenth rotational element (fourth output element) of the automatic transmission 20B.

Figure 10:
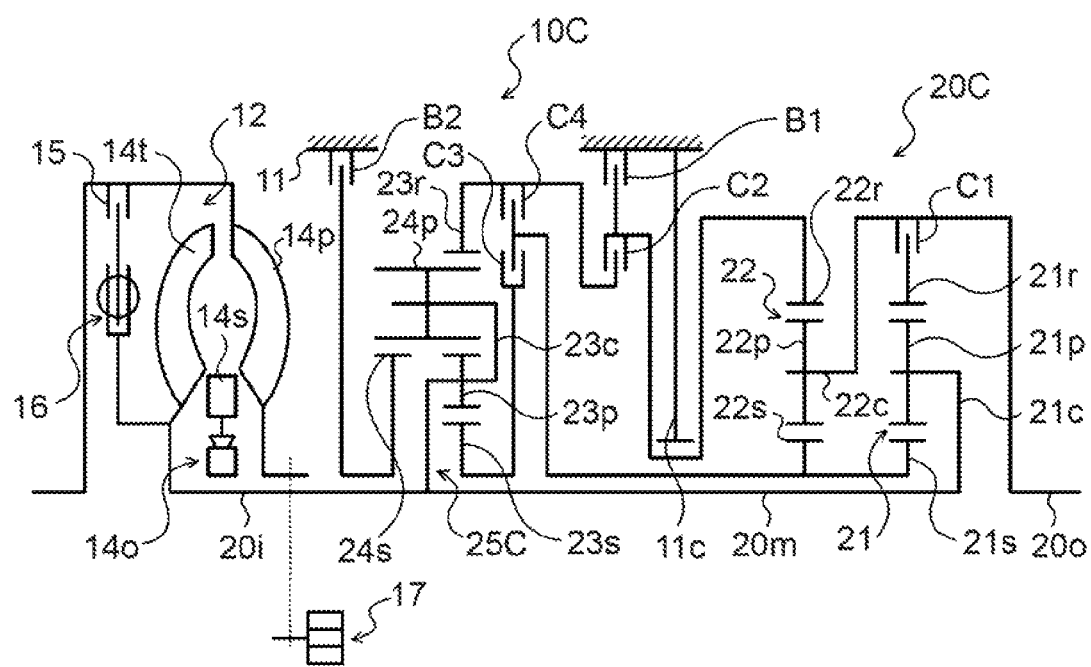
FIG. 10 is a schematic structure diagram of a power transmission device including a multi-stage transmission according to still another embodiment of the present disclosure.
Figure 11:
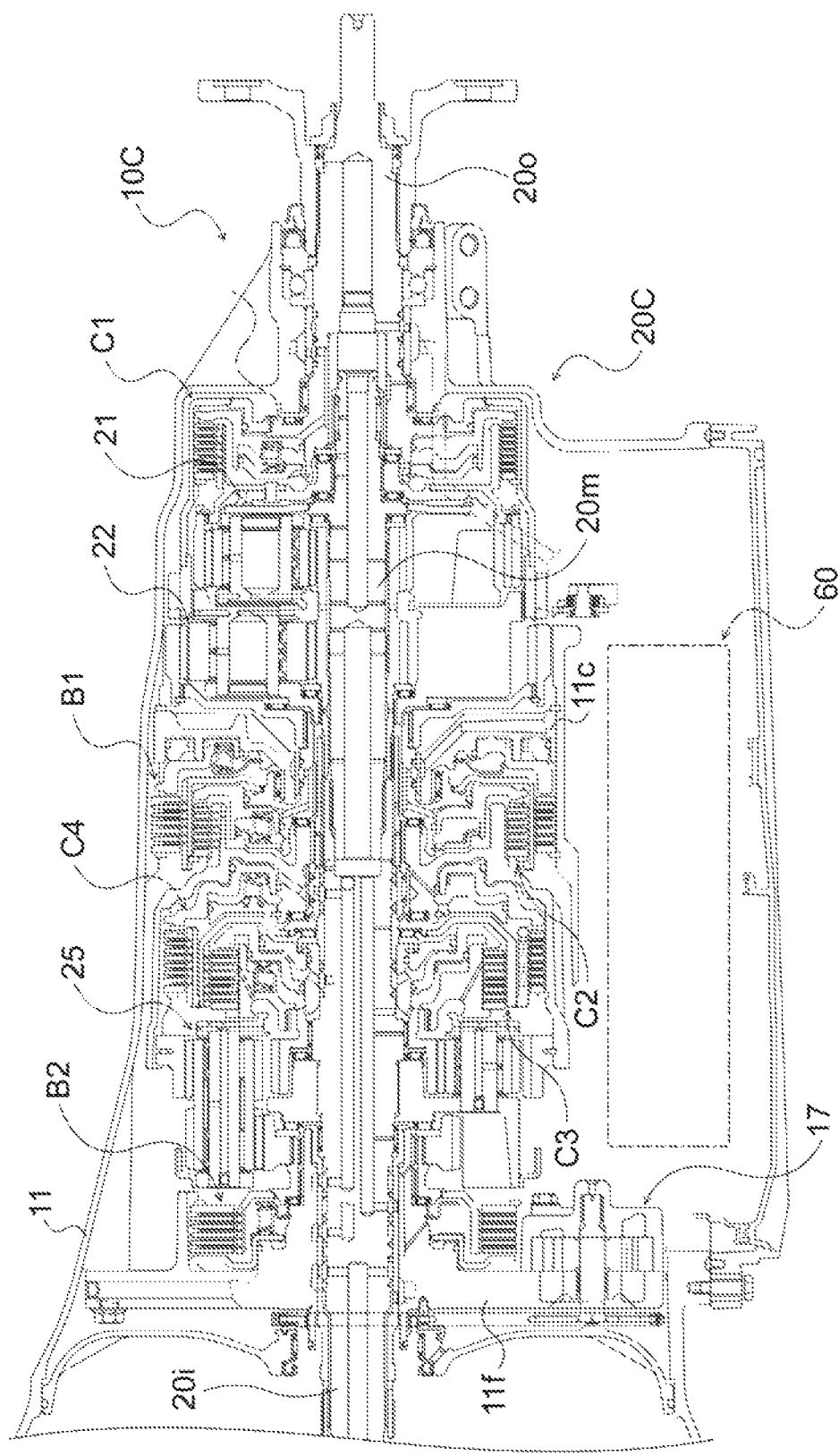
FIG. 11 is a sectional view showing the multi-stage transmission of FIG. 10.

FIG. 10 is a schematic structure diagram of a power transmission device 10C including an automatic transmission 20C serving as a multi-stage transmission according to still another embodiment of the present disclosure. FIG. 11 is a sectional view showing the automatic transmission 20C. The automatic transmission 20C of the power transmission device 10C shown in FIGS. 10 and 11 corresponds to an automatic transmission obtained by replacing the Simpson compound planetary gear train 25 in the automatic transmission 20 described above with a Ravigneaux type planetary gear mechanism 25C serving as a compound planetary gear train. The Ravigneaux type planetary gear mechanism 25C includes the third sun gear 23s and the fourth sun gear 24s that are external gears, the third ring gear 23r that is an internal gear disposed concentrically with the third and the fourth sun gears 23s and 24s, the third pinion gears (short pinion gears) 23p meshing with the third sun gear 23s, the fourth pinion gears (long pinion gears) 24p meshing with the fourth sun gear 24s and the third pinion gears 23p and also meshing with the ring gear 23r, and the third carrier 23c for rotatably and revolvably holding the third pinion gears 23p and the fourth pinion gears 24p.

The third sun gear 23s, the third carrier 23c, the third and the fourth pinion gears 23p and 24p, and the third ring gear 23r of the Ravigneaux type planetary gear mechanism 25C constitute a double-pinion type planetary gear corresponding to the third planetary gear 23 in the compound planetary gear trains 25 and 25B. The fourth sun gear 24s, the third carrier 23c, the fourth pinion gears 24p, and the third ring gear 23r of the Ravigneaux type planetary gear mechanism 25C constitute a single-pinion type planetary gear corresponding to the fourth planetary gear 24 in the compound planetary gear trains 25 and 25B. The Ravigneaux type planetary gear mechanism 25C is structured such that the gear ratio of the double-pinion type planetary gear as the third planetary gear (the number of teeth of the third sun gear 23s/the number of teeth of the third ring gear 23r) is equal to the gear ratio λ3 (=0.581) of the third planetary gear 23 constituting the compound planetary gear trains 25 and 25B, and the gear ratio of the single-pinion type planetary gear as the fourth planetary gear (the number of teeth of the fourth sun gear 24s/the number of teeth of the third ring gear 23r) is equal to the gear ratio λ4 (=0.378) of the fourth planetary gear 24 constituting the compound planetary gear trains 25 and 25B.

Figure 12:
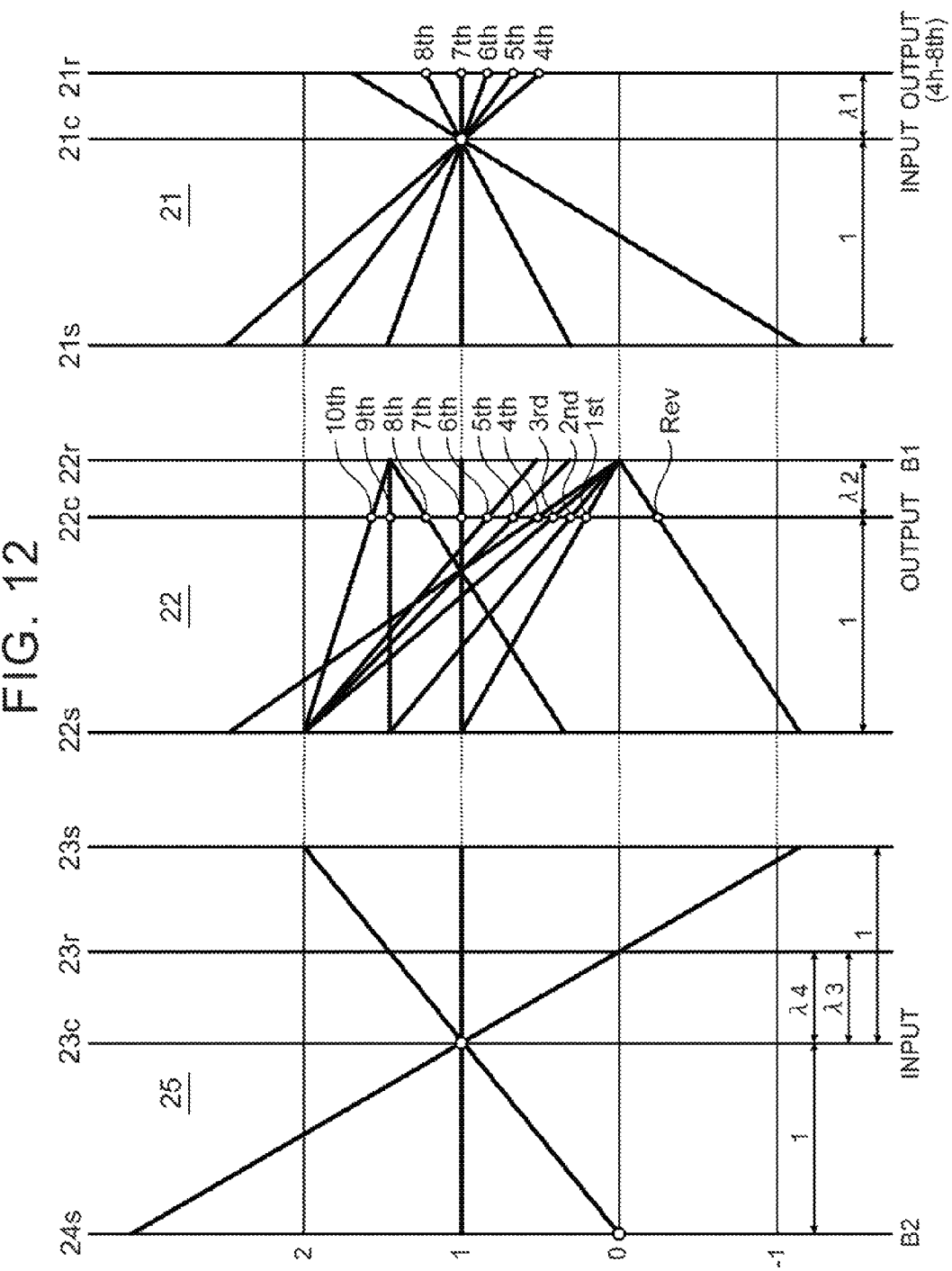
FIG. 12 shows velocity diagrams representing the ratios of the rotational speeds of the rotational elements to the input rotational speed in the multi-stage transmission of FIG. 10.

FIG. 12 shows velocity diagrams representing the ratios of the rotational speeds of the rotational elements to the input rotational speed in the automatic transmission 20C of FIG. 10. As shown in FIGS. 10 and 12, the fourth sun gear 24s of the Ravigneaux type planetary gear mechanism 25C can be non-rotatably held stationary (connected) to the transmission case 11 by the brake B2, and functions as the fixable element of the Ravigneaux type planetary gear mechanism 25C corresponding to the seventh rotational element (second fixable element) of the automatic transmission 20C. The third carrier 23c of the Ravigneaux type planetary gear mechanism 25C is always connected (fixed) to the input shaft 20i, and the power from the engine and/or the like is always transmitted to the third carrier 23c via the input shaft 20i while the power is transmitted from the engine or the like to the input shaft 20i. Thus, the third carrier 23c functions as the input element of the Ravigneaux type planetary gear mechanism 25C corresponding to the eighth rotational element (second input element) of the automatic transmission 20C. Moreover, the third ring gear 23r of the third planetary gear 23 functions as the first output element of the Ravigneaux type planetary gear mechanism 25C corresponding to the ninth rotational element (third output element) of the automatic transmission 20C. The third sun gear 23s of the Ravigneaux type planetary gear mechanism 25C functions as the second output element of the Ravigneaux type planetary gear mechanism 25C corresponding to the tenth rotational element (fourth output element) of the automatic transmission 20C.

Also in the case of the automatic transmission 20C employing the Ravigneaux type planetary gear mechanism 25C that is a compound planetary gear train structured by combining the double-pinion type planetary gear (third planetary gear) with the single-pinion type planetary gear (fourth planetary gear) as described above, the number of components can be reduced to improve the assemblability while keeping the overall weight of the device from increasing.

In the automatic transmission 20C, when the fourth sun gear 24s serving as the fixable element is non-rotatably held stationary by the brake B2, the Ravigneaux type planetary gear mechanism 25C increases the speed of the power transmitted to the third carrier 23c serving as the input element and transmits the resultant power to the third ring gear 23r serving as the first output element and the third sun gear 23s serving as the second output element. As can be understood from FIG. 12, in the automatic transmission 20C, when the output shaft 20o rotates in the direction to drive the vehicle forward, the maximum rotational speed of the third sun gear 23s serving as the second output element is higher than that of the third ring gear 23r serving as the first output element. The third sun gear 23s can easily secure the strength because of its smaller diameter than that of the third ring gear 23r. Thus, in the automatic transmission 20C, to secure strength of component members, such as the clutch hub, the piston, and the cancel plate, of the clutch C3 rotating together with the third sun gear 23s serving as the second output element, less increase is required in dimensions (such as outside diameters and thicknesses), that is, in weight, compared with the automatic transmission 20 in which the fourth ring gear 24r having a larger diameter serves as the second output element that rotates at a higher speed than the first output element. As a result, the rotational inertia of the third sun gear 23s and the members rotating together therewith can be favorably reduced to improve the shift performance of the automatic transmission 20C.

Moreover, in the automatic transmission 20C, the clutch C3 corresponding to the third sun gear 23s rotating at a high speed connects and disconnects the third sun gear 23s having a small diameter as described above to and from the first sun gear 21s of the first planetary gear 21 and the second sun gear 22s of the second planetary gear 22 that have also small diameters and are always connected to each other. Accordingly, in the automatic transmission 20C, the component members of the clutch C3, such as the clutch hub, the piston, and the cancel plate, of the clutch C3 rotating together with the third sun gear 23s, and (at least a part of) the clutch drum rotating together with the first and the second sun gears 21s and 22s, can be disposed between the Ravigneaux type planetary gear mechanism 25C and the second planetary gear 22 (one of the first and the second planetary gears 21 and 22, which is disposed closer to the Ravigneaux type planetary gear mechanism 25C) so as to be located as close as possible to the axial center of the automatic transmission 20C, that is, the input shaft 20i and the intermediate shaft 20m. As a result, in the automatic transmission 20C, the rotational inertia of the third sun gear 23s rotating at a high speed and the members rotating together therewith can be reduced favorably, and the rotational inertia of the first and the second sun gears 21s and 22s and the members rotating together therewith that rotate at higher speeds than the third sun gear 23s can be reduced favorably, as shown in FIG. 12.

Note that, in each of the automatic transmissions 20 to 20C described above, at least any of the clutches C1 to C4 and the brakes B1 and B2 may be a meshing engagement element, such as a dog clutch or a dog brake. For example, each of the automatic transmissions 20 to 20C may employ the dog brake as the brake B1 that is continuously engaged when the first to the fourth forward speeds are established, and also engaged when the reverse speed is established. For example, in the automatic transmissions 20 or the like, the gear ratios λ1 to λ4 of the first to the fourth planetary gears 21 to 24 are not limited to those exemplified in the above description. Moreover, for example, in the automatic transmissions 20 or the like, at least one of the first and the second planetary gears 21 and 22 may be a doable-pinion type planetary gear, and the compound planetary gear train may be of a type other than the Simpson type, the CR-CR type, and the Ravigneaux type. The structure in the periphery of the clutches C3 and C4 described above can naturally be applied to an automatic transmission in which all of the two connection targets (fastening targets) of the clutch C3 and the two connection targets (fastening targets) of the clutch C4 are different. Moreover, each of the automatic transmissions 20 to 20C described above may be used as a transmission mounted on a front-wheel-drive vehicle.

The present disclosure is not in any way limited to the embodiments described above, and various modifications can obviously be made within the breadth of the present disclosure. Moreover, the above-described embodiments to carry out the disclosure are merely specific embodiments of the disclosure described in the summary of the disclosure, and do not limit the elements of the disclosure described in the summary of the disclosure.

INDUSTRIAL APPLICABILITY

The present disclosure can be used in, for example, industries manufacturing transmission devices.

The invention claimed is:
1. A transmission device that changes a speed of power transmitted from a motor to an input shaft and transmits resultant power to an output shaft, the transmission device comprising:
  a compound planetary gear mechanism including an input element, a fixable element, a first output element, and a second output element;
  a first planetary gear and a second planetary gear disposed coaxially and side by side in an axial direction with the compound planetary gear mechanism, and each including a plurality of rotational elements;
  a first brake that connects and non-rotatably holds the fixable element of the compound planetary gear mechanism stationary to a case and releases the fixable element such that the fixable element is rotatable;
  a first clutch that connects the first output element and at least one of the rotational elements of the first and the second planetary gears and releases the connection therebetween; and
  a second clutch that connects the second output element and at least one of the rotational elements of the first and the second planetary gears and releases the connection therebetween, wherein
    the compound planetary gear mechanism increases the speed of the power transmitted to the input element and transmits the resultant power to the first and the second output elements when the fixable element is non-rotatably held stationary by the first brake; and
    the first and the second clutches are disposed between the compound planetary gear mechanism and the second planetary gear, and at least part of both the first and the second clutches radially overlaps both the compound planetary gear mechanism and the second planetary gear as seen from the axial direction.
2. The transmission device according to claim 1, wherein the second planetary gear is disposed on a side closer to the compound planetary gear mechanism than the first planetary gear, the first clutch connects the first output element and any one of the rotational elements of the second planetary gear and releases the connection therebetween, the second clutch connects the second output element and any one of the rotational elements of the second planetary gear and releases the connection therebetween, and the first and the second clutches are disposed on a side closer to the compound planetary gear mechanism than the second planetary gear.

3. The transmission device according to claim 2, wherein the second clutch connects the second output element to the rotational element of the second planetary gear connected to the first output element by the first clutch.

4. The transmission device according to claim 3, further comprising:
a third clutch that connects the first output element of the compound planetary gear mechanism and a rotational element of the second planetary gear other than the rotational element thereof that is connected to the first output element by the first clutch and connected to the second output element by the second clutch and releases the connection therebetween, wherein
the third clutch is disposed on a side closer to the compound planetary gear mechanism than the second planetary gear.

5. The transmission device according to claim 4, wherein the case is provided with a center wall located between the compound planetary gear mechanism and the first and the second planetary gears,
the third clutch includes a hydraulic servo including at least a friction engagement plate and a piston that presses the friction engagement plate, and
hydraulic oil is supplied from a hydraulic oil supply passage formed in the center wall to the hydraulic servo of the third clutch without passing through the input shaft.

6. The transmission device according to claim 5, further comprising
a second brake that includes at least a friction engagement plate and a piston pressing the friction engagement plate and connects and non-rotatably holds the rotational element of the second planetary gear connected to the first output element by the third clutch stationary to the case, wherein
the case is provided with a center wall located between the compound planetary gear mechanism and the first and the second planetary gears, and
an engagement oil chamber of the second brake is defined between the piston of the second brake and the center wall.

7. The transmission device according to claim 1, wherein the first and the second clutches each include a hydraulic servo that includes at least a friction engagement plate and a piston pressing the friction engagement plate and is disposed on the input shaft, and
hydraulic oil is supplied from a hydraulic oil supply passage formed in the case to the hydraulic servo of each of the first and the second clutches through an in-shaft oil-passage formed in the input shaft.

8. The transmission device according to claim 1, further comprising:
a fourth clutch that connects any one of the rotational elements of the first planetary gear and the output shaft and releases the connection therebetween, wherein
the second planetary gear includes a rotational element always connected to the output shaft and a rotational element always connected to a rotational element of the first planetary gear other than the rotational element thereof connected to the output shaft by the fourth clutch.

9. The transmission device according to claim 8, wherein the fourth clutch includes at least a friction engagement plate and a piston that presses the friction engagement plate, and
an engagement oil chamber of the fourth clutch is defined between the piston of the fourth clutch and the output shaft and is supplied with hydraulic oil through an in-shaft oil-passage formed in the output shaft.

10. The transmission device according to claim 1, wherein the compound planetary gear mechanism includes third and fourth planetary gears each including three rotational elements and is structured by always connecting each of any two of the rotational elements of the third planetary gear to corresponding one of any two of the rotational elements of the fourth planetary gear.

11. The transmission device according to claim 1, wherein the first planetary gear includes a first rotational element, a second rotational element, and a third rotational element,
the second planetary gear includes a fourth rotational element, a fifth rotational element, and a sixth rotational element,
the first rotational element of the first planetary gear is always connected to the fourth rotational element of the second planetary gear,
the second rotational element of the first planetary gear and the input element of the compound planetary gear mechanism are always connected to the input shaft,
the fifth rotational element of the second planetary gear is always connected to the output shaft,
the first clutch connects the first rotational element of the first planetary gear and the fourth rotational element of the second planetary gear always connected to each other and the first output element of the compound planetary gear mechanism and releases the connection therebetween,
the second clutch connects the first rotational element of the first planetary gear and the fourth rotational element of the second planetary gear always connected to each other and the second output element of the compound planetary gear mechanism and releases the connection therebetween, and
the transmission device further includes a third clutch that connects the sixth rotational element of the second planetary gear and the first output element of the compound planetary gear mechanism and releases the connection therebetween, a fourth clutch that connects the output shaft and the fifth rotational element of the second planetary gear always connected to each other and the third rotational element of the first planetary gear and releases the connection therebetween, and a second brake that non-rotatably holds the sixth rotational element of the second planetary gear stationary and releases the sixth rotational element such that the sixth rotational element is rotatable.

12. The transmission device according to claim 11, wherein
a first forward speed is established by engaging the first clutch, the second clutch, and the second brake,
a second forward speed is established by engaging the first clutch, the first brake, and the second brake,
a third forward speed is established by engaging the second clutch, the first brake, and the second brake, a fourth forward speed is established by engaging the fourth clutch, the first brake, and the second brake, a fifth forward speed is established by engaging the second clutch, the fourth clutch, and the first brake, a sixth forward speed is established by engaging the first clutch, the fourth clutch, and the first brake, a seventh forward speed is established by engaging the first clutch, the third clutch, and the fourth clutch, an eighth forward speed is established by engaging the third clutch, the fourth clutch, and the first brake, a ninth forward speed is established by engaging the first clutch, the third clutch, and the first brake, a tenth forward speed is established by engaging the second clutch, the third clutch, and the first brake and a reverse speed is established by engaging the second clutch, the third clutch, and the second brake.

13. The transmission device according to claim 1, wherein the compound planetary gear mechanism includes a single-pinion type third planetary gear including a third sun gear, and a third ring gear, a third carrier that rotatably and revolvably holds a plurality of third pinion gears each meshing with the third sun gear and the third ring gear, and also includes a single-pinion type fourth planetary gear including a fourth sun gear, a fourth ring gear, and a fourth carrier that rotatably and revolvably holds a plurality of fourth pinion gears each meshing with the fourth sun gear and the fourth ring gear, and the fixable element is the third sun gear and the fourth sun gear always connected to each other, the input element is the third carrier, the first output element is the third ring gear and the fourth carrier always connected to each other, and the second output element is the fourth ring gear.

14. The transmission device according to claim 1, wherein the compound planetary gear mechanism includes a single-pinion type third planetary gear including a third sun gear, a third ring gear, and a third carrier that rotatably and revolvably holds a plurality of third pinion gears each meshing with the third sun gear and the third ring gear, and also includes a single-pinion type fourth planetary gear including a fourth sun gear, a fourth ring gear, and a fourth carrier that rotatably and revolvably holds a plurality of fourth pinion gears each meshing with the fourth sun gear and the fourth ring gear, and the fixable element is the fourth sun gear, the input element is the third ring gear and the fourth carrier always connected to each other, the first output element is the third carrier and the fourth ring gear always connected to each other, and the second output element is the third sun gear.

15. The transmission device according to claim 1, wherein the output shaft is connected to rear wheels of a vehicle via a differential gear.

16. A transmission device that changes a speed of power transmitted from a motor to an input shaft and transmits resultant power to an output shaft, the transmission device comprising:

a compound planetary gear mechanism including an input element, a fixable element, a first output element, and a second output element;

a first planetary gear and a second planetary gear disposed coaxially and side by side in an axial direction with the compound planetary gear mechanism, and each including a plurality of rotational elements;

a first brake that connects and non-rotatably holds the fixable element of the compound planetary gear mechanism stationary to a case and releases the fixable element such that the fixable element is rotatable;

a first clutch that connects the first output element and at least one of the rotational elements of the first and the second planetary gears and releases the connection therebetween; and a second clutch that connects the second output element and at least one of the rotational elements of the first and the second planetary gears and releases the connection therebetween, wherein the compound planetary gear mechanism increases the speed of the power transmitted to the input element and transmits the resultant power to the first and the second output elements when the fixable element is non-rotatably held stationary by the first brake;

the first and the second clutches are disposed on a side closer in the axial direction to the compound planetary gear mechanism than the first and the second planetary gear mechanisms;

the compound planetary gear mechanism is a Ravigneaux type planetary gear including a third sun gear, a fourth sun gear, a third pinion gear meshing with the third sun gear, a fourth pinion gear meshing with the fourth sun gear and also meshing with the third pinion gear, a third carrier rotatably and revolvably holding the third and the fourth pinion gears, and a third ring gear meshing with the fourth pinion gear; and the fixable element is the fourth sun gear, the input element is the fourth carrier, the first output element is the third ring gear, and the second output element is the third sun gear.

17. The transmission device according to claim 16, wherein the second planetary gear is disposed on a side closer to the compound planetary gear mechanism than the first planetary gear, the first clutch connects the first output element and any one of the rotational elements of the second planetary gear and releases the connection therebetween, the second clutch connects the second output element and any one of the rotational elements of the second planetary gear and releases the connection therebetween, and the first and the second clutches are disposed on a side closer to the compound planetary gear mechanism than the second planetary gear.

18. The transmission device according to claim 16, wherein the first and the second clutches each include a hydraulic servo that includes at least a friction engagement plate and a piston pressing the friction engagement plate and is disposed on the input shaft, and hydraulic oil is supplied from a hydraulic oil supply passage formed in the case to the hydraulic servo of each of the first and the second clutches through an in-shaft oil-passage formed in the input shaft.

19. The transmission device according to claim 16, further comprising:

a fourth clutch that connects any one of the rotational elements of the first planetary gear and the output shaft and releases the connection therebetween, wherein the second planetary gear includes a rotational element always connected to the output shaft and a rotational element always connected to a rotational element of the first planetary gear other than the rotational element thereof connected to the output shaft by the fourth clutch.

20. The transmission device according to claim 16, wherein the compound planetary gear mechanism includes third and fourth planetary gears each including three rotational elements and is structured by always connecting each of any two of the rotational elements of the third planetary gear to corresponding one of any two of the rotational elements of the fourth planetary gear.

\* \* \* \* \*